(12) United States Patent
Stephens et al.

(10) Patent No.: US 11,594,081 B2
(45) Date of Patent: Feb. 28, 2023

(54) VALVE TESTING FOR ENGINES

(71) Applicant: Honda Motor Co., Ltd., Tokyo (JP)

(72) Inventors: Kaleb Stephens, Pell City, AL (US); John Michael Scelsi, Pell City, AL (US)

(73) Assignee: Honda Motor Co., Ltd., Tokyo (JP)

( * ) Notice: Subject to any disclaimer, the term of this patent is extended or adjusted under 35 U.S.C. 154(b) by 75 days.

(21) Appl. No.: 17/346,133

(22) Filed: Jun. 11, 2021

(65) Prior Publication Data
US 2022/0398875 A1 Dec. 15, 2022

(51) Int. Cl.
| | |
|---|---|
| *G07C 5/08* | (2006.01) |
| *G01L 5/00* | (2006.01) |
| *G01M 15/04* | (2006.01) |
| *F01L 1/047* | (2006.01) |
| *F01L 9/20* | (2021.01) |
| *F01L 1/08* | (2006.01) |

(52) U.S. Cl.
CPC ............ *G07C 5/0808* (2013.01); *F01L 1/047* (2013.01); *F01L 1/08* (2013.01); *F01L 9/20* (2021.01); *G01L 5/00* (2013.01); *G01M 15/042* (2013.01); *G07C 5/0825* (2013.01); *G07C 5/0833* (2013.01); *F01L 2820/04* (2013.01)

(58) Field of Classification Search
CPC .... F01L 1/08; F01L 1/047; F01L 9/20; G07C 5/0808; G01L 5/00
See application file for complete search history.

(56) References Cited

U.S. PATENT DOCUMENTS

| | | | |
|---|---|---|---|
| 6,925,977 B2 | 8/2005 | Hirowatari et al. | |
| 7,246,583 B2 | 7/2007 | Cinpinski et al. | |
| 9,890,732 B2 | 2/2018 | Younkins et al. | |
| 2018/0100461 A1* | 4/2018 | Eom ..................... | F02N 11/106 |

FOREIGN PATENT DOCUMENTS

| | | |
|---|---|---|
| CN | 107782557 A | 3/2018 |
| CN | 108132150 B | 3/2020 |
| DE | 19752194 B4 | 8/2006 |
| EP | 3073071 A1 | 9/2016 |
| JP | H11281532 A | 10/1999 |
| KR | 20010066222 A | 7/2001 |

* cited by examiner

*Primary Examiner* — Kevin A Lathers
(74) *Attorney, Agent, or Firm* — Suzanne Gagnon; American Honda Motor Co., Inc.

(57) ABSTRACT

An apparatus is provided to test valves. The apparatus includes a sensor and a driving mechanism. The driving mechanism is configured to control an external camshaft that is coupled to a valve train of an engine head. The apparatus controls the driving mechanism to control a rotation of the external camshaft that further controls an activation of each valve of the valve train associated with the engine head. The apparatus further controls the sensor to acquire information associated with the activation of each valve of the valve train based on the rotation of the external camshaft. The apparatus further compares the acquired information with pre-stored information, to determine an abnormality in each valve of the valve train, and generates a notification based on the comparison.

20 Claims, 12 Drawing Sheets

VALVE TESTING FOR ENGINES

CROSS-REFERENCE TO RELATED APPLICATIONS

The present application is related to co-pending patent application entitled VALVE TESTING APPARATUS, filed on the same date as the present application Ser. No. 17/346, 148, which is incorporated herein by reference in its entirety.

BACKGROUND

Valves may be generally used to control a fluid flow (such as airflow, gasoline flow, or a combination of both) in one or more machines (such as an engine). Typically, valves may releasably couple with ports (such as inlet and outlet ports) of the machine and configured to control the fluid flow in the machine. In certain cases, there may be an abnormality (such as an interference between the valves and the ports, or a leakage between the valves and the ports) during an installation of the valves on the ports. Such abnormality during installation of the valves may lead to improper valve actuation (such as abnormal combustion cycle, in case the machine is the engine) and may subsequently affect the performance of the machine. Therefore, during the installation of the valves, it may be necessary to test an assembly between the valves and the ports of the machine.

In certain cases, the valves may be activated (such as a movement of the valves to open and close the ports of the machine) to test the assembly between the valves and the ports of the machine. If the valves are activated faster than a required speed, then it may be difficult to precisely determine an abnormal valve from multiple valves. Further, if the valves are activated slowly than the required speed, then there might be an impact on a cycle time (such as an increase in time that may have incurred to activate the valves and test the assembly between the valves and the ports of the machine).

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An exemplary aspect of the disclosure provides an apparatus. The apparatus may include a sensor and circuitry communicably coupled to the sensor and a driving mechanism. The driving mechanism may be associated with the sensor and configured to control an external camshaft that may be coupled to a valve train of an engine head. The circuitry may be configured to control the driving mechanism to control a rotation of the external camshaft that may further control an activation of each valve of the valve train associated with the engine head. The circuitry may further control the sensor to acquire information associated with the activation of each valve of the valve train based on the rotation of the external camshaft. The circuitry may further compare the acquired information with pre-stored information, to determine an abnormality in each valve of the valve train. The circuitry may further generate a notification based on the comparison.

Another exemplary aspect of the disclosure provides a method. The method may be executed in an apparatus that may have a sensor and a driving mechanism associated with the sensor. The driving mechanism may be configured to control an external camshaft that may be coupled to a valve train of an engine head. The method may include controlling the driving mechanism to control a rotation of the external camshaft that may further control an activation of each valve of the valve train associated with the engine head. The method may further include controlling the sensor to acquire information associated with the activation of each valve of the valve train based on the rotation of the external camshaft. The method may further include comparing the acquired information with pre-stored information, to determine an abnormality in each valve of the valve train. The method may further include generating a notification based on the comparison.

This summary is provided to introduce a selection of concepts in a simplified form that is further disclosed in the detailed description of the present disclosure. This summary is not intended to identify key or essential inventive concepts of the claimed subject matter, nor is it intended for determining the scope of the claimed subject matter.

Figure 1:
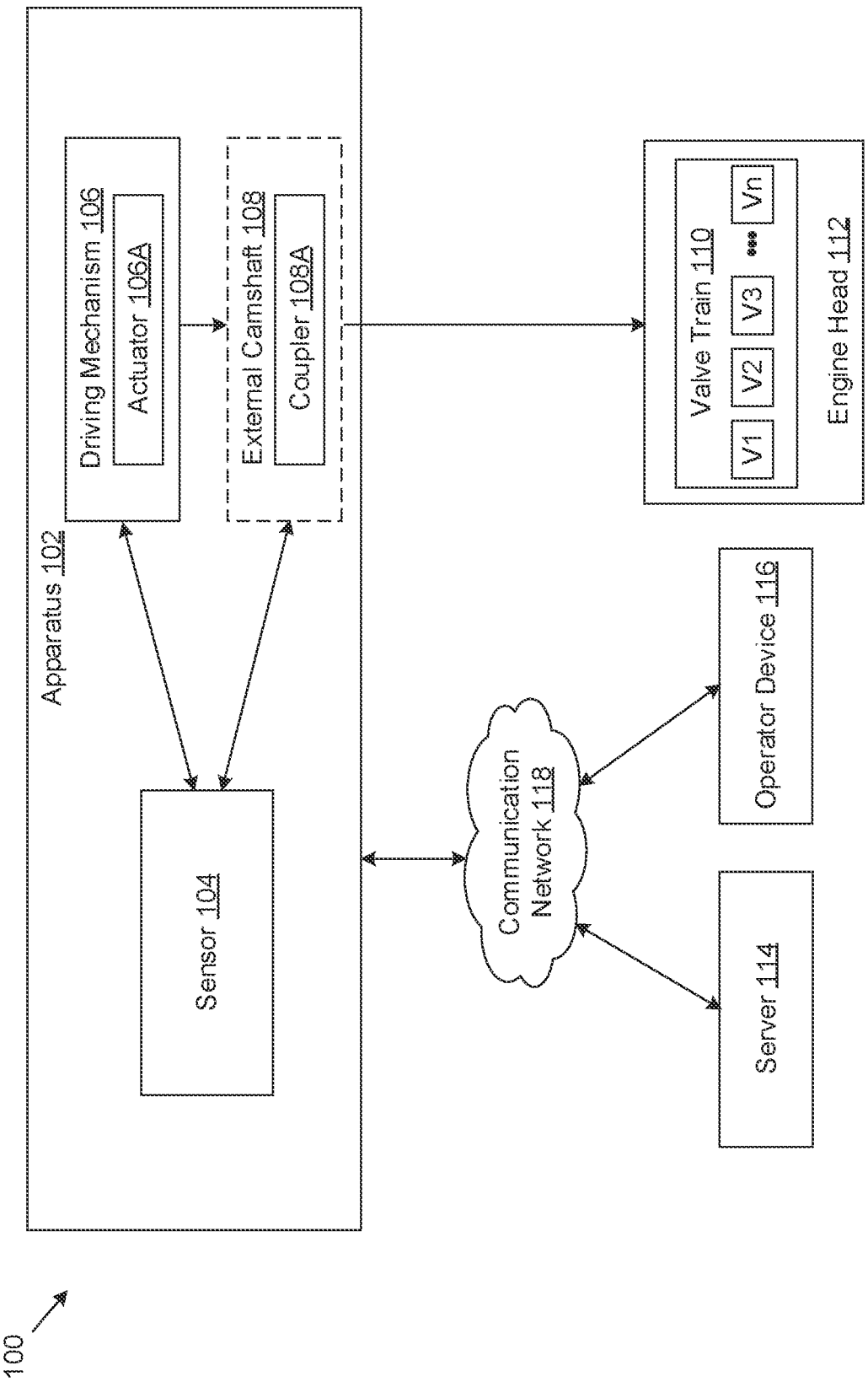
FIG. 1 is a block diagram that illustrates an exemplary network environment of an apparatus to test valves, in accordance with an embodiment of the disclosure.

The foregoing summary, as well as the following detailed description of the present disclosure, is better understood when read in conjunction with the appended drawings. To illustrate the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may provide an apparatus, for example, an apparatus to test an assembly of valves of a machine (such as an engine head). The apparatus may include a sensor that may be communicably coupled to a driving mechanism and an external camshaft associated with the driving mechanism. The apparatus may be configured to control the driving mechanism to control a rotation of the external camshaft that may further control an activation of each valve of a valve train that may be associated with an engine head. Based on the activation of each valve of the valve train, an assembly of the valve train on corresponding ports may be tested for an abnormality (such as an interference between the valves and the ports, or a leakage between the valves and the ports) in the assembly of the valve train.

Further, based on the rotation of the external camshaft, the valves may be activated (such as a movement of the valves to open and close the ports of the machine) to test the assembly between the valves and the ports of the machine. In certain cases, there may be a requirement to control a movement of the external camshaft, to precisely determine an abnormal valve from multiple valves of the valve train. In such cases, based on user requirements, the apparatus may control the driving mechanism to control at least one of: a position of the external camshaft, a velocity of the external camshaft, or an acceleration of the external camshaft, to precisely determine the abnormal valve from multiple valves of the valve train. Hence, such precise determination of the abnormality may improve a quality of installation of the valves on the ports of the engine head.

In certain cases, the external camshaft may be directly coupled to the valve train. In an example, each lobe of the external camshaft may be axially coupled to corresponding valves of the valve train, without any interconnecting element (such as a lifter, a push rod, a rocker arm, etc.) between the external camshaft and the valves of the valve train. In such cases, as there is no interconnecting element, the apparatus may control the sensor to independently acquire information associated with the activation of each valve of the valve train based on the rotation of the external camshaft. Hence, each valve of the valve train may be independently tested for the abnormality. Based on the detected abnormality, each valve of the valve train may be selectively adjusted to improve the quality of the assembly of the valve train on the engine head.

Reference will now be made in detail to specific aspects or features, examples of which are illustrated in the accompanying drawings. Wherever possible, corresponding or similar reference numbers will be used throughout the drawings to refer to the same or corresponding parts.

FIG. 1 is a block diagram that illustrates an exemplary network environment of an apparatus to test valves, in accordance with an embodiment of the disclosure. With reference to FIG. 1, there is shown an exemplary view 100 of an apparatus 102. The apparatus 102 may include a sensor 104, a driving mechanism 106 that has an actuator 106A, and an external camshaft 108 that may include a coupler 108A to couple with the driving mechanism 106. The external camshaft 108 may be coupled to a valve train 110 of an engine head 112, to activate each valve of the valve train 110. Based on the activation, the apparatus 102 may be configured to communicably coupled with a server 114 and/or an operator device 116, via a communication network 118. In some embodiments, the driving mechanism 106 and the external camshaft 108 may not be integrated in the apparatus 102, and may be communicably coupled with the apparatus 102 (say via a wired or a wireless connection like the communication network 118).

The apparatus 102 may be configured to determine an abnormality (such as an interference between the valves and the ports, or a leakage between the valves and the ports) in each valve of the valve train 110. For example, the apparatus 102 may control the sensor 104 to acquire information associated with the activation of each valve of the valve train 110. Based on the acquired information, the apparatus 102 may be configured to determine the abnormality in each valve of the valve train 110. Details of the determination of the abnormality are further described, for example, in FIG. 4B. In some embodiments, the apparatus 102 may be configured to be interchangeably coupled with variable external camshafts (such as camshafts shown in FIGS. 5A-5C, FIGS. 6A-6C, and FIGS. 7A-7C), based on user requirements. Details of such implementations are further described, for example, in FIGS. 5A-5C, FIGS. 6A-6C, and FIGS. 7A-7C. In an embodiment, the apparatus 102 may have a substantially rectangular structure that may be horizontally disposed in an assembly line (not shown) of a manufacturing plant (not shown). Such substantially rectangular structure may facilitate the stability of the apparatus 102. In other embodiments, the apparatus 102 may also have any structure other than the substantially rectangular structure, which may include, but not limited to, a substantially square structure, or a substantially polygonal structure, etc.

In an embodiment, the apparatus 102 may integrally include the driving mechanism 106 as a part of the apparatus 102 and configured to control the driving mechanism 106 to control the activation of the actuator 106A that further controls the rotation of the external camshaft 108. Alternatively, in case the apparatus 102 is remotely coupled to the driving mechanism 106, the apparatus 102 may communicably control the driving mechanism 106, via the communication network 118, to control the activation of the actuator 106A that further controls the rotation of the external camshaft 108, to activate each valve of the valve train 110.

In another embodiment, the apparatus 102 may integrally include the sensor 104 as a part of the apparatus 102 and configured to control the sensor 104 to acquire information associated with the activation of each valve of the valve train 110. Alternatively, in case the apparatus 102 is remotely coupled to the sensor 104, the apparatus 102 may remotely control the sensor 104, via the communication network 118, to acquire the information associated with the activation of each valve of the valve train 110.

The sensor 104 may include suitable logic, circuitry, and interfaces that may be configured to detect at least one of: linear forces, rotational forces, or torsional forces, of the external camshaft 108 on the corresponding valve of the valve train 110. In an embodiment, the sensor 104 may include a detection element (not shown) that may be configured to detect at least one of: the linear forces, the rotational forces, or the torsional forces of each lobe (as shown in FIGS. 5A-5C, FIGS. 6A-6C, and FIGS. 7A-7C) of the external camshaft 108 on the corresponding valve of the valve train 110, based on the rotation of the external camshaft 108. In an embodiment, the sensor 104 may be disposed between the driving mechanism 106 and the external camshaft 108. Examples of the sensor 104 may include, but are not limited to, a torque sensor, a force sensor, a force-torque (FT) sensor, a strain gauge, a piezoelectric transducer, a rotary torque transducer, a reaction torque transducer, a load cell, or a Force Sensing Resistor (FSR). In an embodiment, the sensor 104 may be communicably associated with the driving mechanism 106, to acquire the information associated with the activation of each valve of the valve train 110.

The driving mechanism 106 may include suitable logic, circuitry, and interfaces that may be configured to control the external camshaft 108 that may be coupled to the valve train 110 of the engine head 112. For example, the driving mechanism 106 may be configured to rotate the external camshaft 108 and directly control the activation of each valve of the valve train 110 associated with the engine head 112. In another example, the driving mechanism 106 may be configured to rotate the external camshaft 108 and communicably control the activation of each valve of the valve train 110, via a plurality of engagement members (not shown). In an embodiment, at least one of the plurality of engagement members may be configured to be coupled with a particular valve of the valve train 110 associated with an engine head 112. The plurality of engagement members may be configured to receive a rotational force from the external camshaft 108 and transmit as a linear force on each of the valve of the valve train 110, to activate each valve. In an embodiment, the driving mechanism 106 may be configured to control at least one of: a position of the external camshaft 108, a velocity of the external camshaft 108, or an acceleration of the external camshaft 108, based on the user requirements. For example, the driving mechanism 106 may be configured to control the actuator 106A to control at least one of: the position (such as a change in position due to a rotational movement) of the external camshaft 108, the velocity (such as an angular velocity) of the external camshaft 108, or the acceleration (such as an angular acceleration) of the external camshaft 108, based on the user requirements. Details of such control of the driving mechanism 106 are described, for example, in FIGS. 4A-4C.

The actuator 106A may include suitable logic, circuitry, and interfaces that may be associated with the driving mechanism 106 and configured to rotate the external camshaft 108 that is coupled to the valve train 110 of the engine head 112. In an embodiment, the actuator 106A may include a servomotor that may be activated to control the rotation of the external camshaft 108. For example, the servomotor may be a rotary actuator or a linear actuator, which may be configured to precisely control the position (such as a change in position due to the rotational movement) of the external camshaft 108, the velocity (such as the angular velocity) of the external camshaft 108, or the acceleration (such as the angular acceleration) of the external camshaft 108, based on the activation of the servomotor. The servomotor is merely an example of the actuator 106A. The actuator 106A may include any other driving units to control the rotation of the external camshaft 108. Examples of such driving units may include, but are not limited to, a stepper motor, or an induction motor, which may be configured to control the rotation of the external camshaft 108. In an embodiment, the actuator 106A may be directly coupled to the external camshaft 108 to control the rotation of the external camshaft 108. In another embodiment, the actuator 106A may be remotely coupled to the external camshaft 108, via the coupler 108A, to control the rotation of the external camshaft 108.

The external camshaft 108 may be configured to control the activation of each valve of the valve train 110 associated with the engine head 112. In an embodiment, the external camshaft 108 may include a plurality of lobes (as shown in FIGS. 5A-5C, FIGS. 6A-6C, and FIGS. 7A-7C). Each lobe of the plurality of lobes may be configured to be coupled with each valve of the valve train 110. In an example, based on the rotation of the external camshaft 108, each lobe of the plurality of lobes of the external camshaft 108 may be configured to activate the corresponding valve of the valve train 110. In some embodiments, the external camshaft 108 may be implemented as an interchangeable camshaft (such as camshafts shown in FIGS. 5A-5C, FIGS. 6A-6C, and FIGS. 7A-7C) that may be configured to be interchangeably coupled with the driving mechanism 106 of the apparatus 102, based on the user requirements. Details of such embodiments are further described, for example, in FIGS. 5A-5C, FIGS. 6A-6C, and FIGS. 7A-7C. In an embodiment, the external camshaft 108 may have a substantially cylindrical structure. Such substantially cylindrical structure may improve the stability of the apparatus 102 during the rotation of the external camshaft 108. In other embodiments, the apparatus 102 may also have any structure other than the substantially cylindrical structure which may include, but not limited to, a substantially polygonal structure, etc.

In an embodiment, the external camshaft 108 may include a shaft that is configured to receive the plurality of lobes. In one example, the shaft and the plurality of lobes of the external camshaft 108 are formed as a monolithic structure, such as, a single block of a metal blank that may have a uniform grain structure and better resistance against any wear due to the usage of the apparatus 102. In another example, the shaft and the plurality of lobes of the external camshaft 108 are coupled via a splined arrangement (not shown). In the splined arrangement, the shaft of the external camshaft 108 may have a male mating part (not shown) that may be configured to mate with a female mating part (not shown) of each lobe of the plurality of lobes and form a rigid connection, based on the user requirements. In another embodiment, the shaft of the external camshaft 108 may be coupled to the driving mechanism 106, via the coupler 108A.

The coupler 108A may include a plurality of connecting members that may be configured to couple the shaft of the external camshaft 108 with the driving mechanism 106. In an embodiment, the plurality of connecting members may include mechanical flexing couplings to transfer a rotational force from the driving mechanism 106 to the external camshaft 108. In an example, the mechanical flexing couplings may include gear couplings that may be configured to transfer the rotational force from the driving mechanism 106 to the external camshaft 108. The gear couplings are merely an example and there may be another coupling mechanism to couple the driving mechanism 106 and the external camshaft 108. Examples of such other coupling mechanisms may include, but are not limited to, grid couplings, roller couplings, and the like. In an embodiment, based on the coupler 108A, the rotation of the external camshaft 108 may be controlled, which further controls the activation of each valve of the valve train 110.

The valve train 110 may be configured to control a plurality of ports (such as the inlet port, or the exhaust port) of the engine head 112. For example, each cylinder of the engine head 112 may include the inlet port and the exhaust port, which may be releasably closed by the corresponding valve of the valve train 110. In an embodiment, the valve train 110 may be disposed on a top surface of the engine head 112 and configured to releasably close each port of the plurality of ports of the engine head 112. In an embodiment, each valve of the valve train 110 may be activated by the apparatus 102, based on the rotation of the external camshaft 108. In another embodiment, each valve of the valve train 110 may be directly activated (such as, via a solenoid mechanism) by the apparatus 102, without a need of the external camshaft 108. For example, each valve of the valve train 110 may be directly activated from an electronic actuation of the solenoid mechanism on each valve of the valve train 110, without any additional member (such as, the external camshaft 108) that may be connected with each valve of the valve train 110 of the engine head 112.

In an embodiment, the valve train 110 may include a plurality of valves. For example, the plurality of valves may include a first valve "V1", a second valve "V2", a third valve "V3", and a Nth Valve "Vn". The N number of valves shown in FIG. 1 is presented merely as an example. The valve train 110 may include only one valve or more than N valves (such as four valves shown in FIG. 1) on the engine head 112, without deviation from the scope of the disclosure. For the sake of brevity, only four valves have been shown in FIG. 1. Based on the number of valves of the valve train 110 on the engine head 112, the apparatus 102 may be configured to select the external camshaft 108 with a corresponding number of lobes on the external camshaft 108.

The engine head 112 may be configured to hold the plurality of valves of the valve train 110, a plurality of spark plugs (not shown), a plurality of fuel injectors (not shown), etc. In an embodiment, based on an arrangement of the plurality of ports and corresponding valves of the valve train 110, the engine head 112 may have a plurality of configurations. For example, in one implementation, the engine head 112 may have a loop-flow configuration (i.e., the plurality of ports and the valve train 110 are disposed in a single side on the engine head 112), an inline cross-flow configuration (i.e., the plurality of ports and the valve train 110 are disposed in on opposing sides on the engine head 112), or an offset cross-flow configuration (i.e., the inlet port and the exhaust port of each cylinder portion of the engine head 112 may be disposed on opposing sides and offset from each other, when such ports and the valve train 110 are located on the engine head 112). In an embodiment, the apparatus 102 may determine the abnormality in each valve of the valve train 110 associated with the engine head 112 and store information associated with the determined abnormality in the server 114.

The server 114 may include suitable logic, circuitry, interfaces, and/or code that may be configured to communicate with the apparatus 102 to exchange information (i.e. associated with the abnormality determined in each valve of the valve train 110), via the communication network 118. In an embodiment, the server 114 may be configured to store pre-stored information associated with a standard valve train assembly that may be preset by the user, and further transmit the pre-stored information to the apparatus 102 for the determination of the abnormality in each valve of the valve train 110. In another embodiment, the server 114 may be configured to receive the information associated with the abnormality of each valve of the valve train 110 and store the received information. In certain cases, the server 114 may be configured to transmit the stored information to the apparatus 102, for the determination of the abnormality in a different valve train (which may be substantially similar to the valve train 110). The different valve train may be a part of the engine head 112, or a part of another machine.

In an embodiment, the server 114 may be a cloud server, which may be utilized to execute various operations through web applications, cloud applications, HTTP requests, repository operations, file transfer, and the like. Examples of the server 114 may include, but are not limited to, an event server, a database server, a file server, a web server, a media server, a content server, an application server, a mainframe server, or a combination thereof. In one or more embodiments, the server 114 may be implemented as a plurality of distributed cloud-based resources. In an embodiment, the server 114 may be configured to communicate with at least one of: the apparatus 102, or the operator device 116, via the communication network 118, to exchange the information about the abnormality and/or the pre-stored information.

The operator device 116 may include suitable logic, circuitry, and/or interfaces that may be configured to notify a user (not shown), based on the detection of the abnormality associated with each valve of the valve train 110. In one example, the notification may relate to information associated with a faulty valve in the valve train, which may require an overhaul. In an embodiment, the operator device 116 may be a part of the apparatus 102. In another embodiment, the operator device 116 may be communicably coupled to the apparatus 102, via the communication network 118. Examples of the operator device 116 may include, but are not limited to, a computing device, a smartphone, a cellular phone, a tablet computer, a mobile phone, and other portable devices. In an embodiment, the operator device 116 may be configured to provide a notification or alert that includes at least one of: a tactile notification (such as via a in-built vibratory component), an audible notification (such as via an in-built audio component, like speaker), or a visual notification (such as via an in-built video component, like display screen or a light emitting device).

The vibratory component may include suitable logic, circuitry, and interfaces that may be configured to transmit the vibratory notification to the user, based on the detected abnormality in each valve of the valve train 110. In an example, the vibratory component may be a vibration motor that may be integrally coupled to the operator device 116. In another example, the vibratory component may be a vibration motor that may be communicably coupled to the operator device 116, via the communication network 118.

Figure 2:
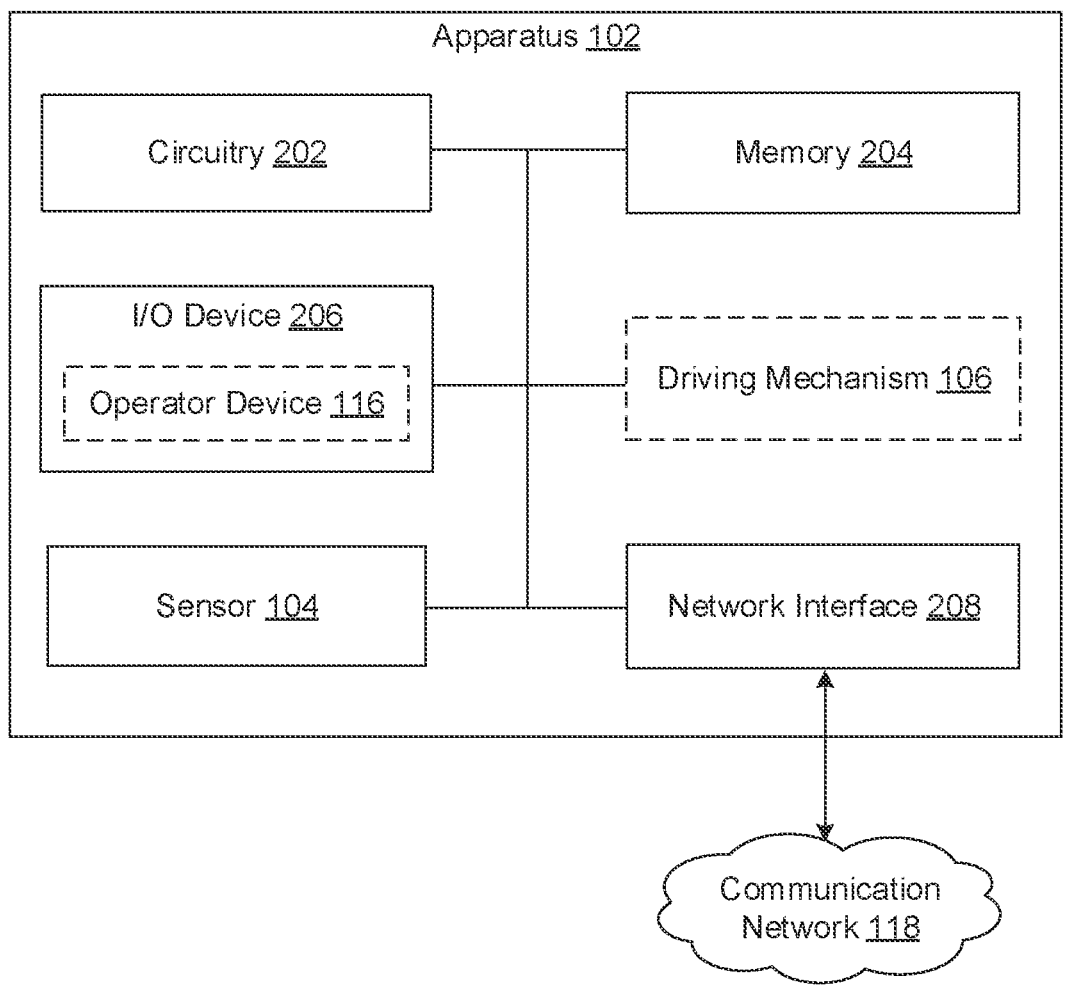
FIG. 2 is a block diagram of the apparatus of FIG. 1, in accordance with an embodiment of the disclosure.

The audio component may include suitable logic, circuitry, and interfaces that may be configured to transmit the audible notification to the user, based on the detected abnormality in each valve of the valve train 110. In an embodiment, the audio component may be configured to control playback of an audio output or signal, based on the detected abnormality in each valve of the valve train 110. The audio component may be configured to receive electrical audio signals from the apparatus 102 or from the operator device 116 and convert the received electrical audio signals into the audio/sound output. In an embodiment, the audio component may be communicably coupled to the apparatus 102, via the communication network 118. In another embodiment, the audio component may be integrally formed in the apparatus 102, as an I/O device (as shown in FIG. 2). Examples of the audio component may include, but are not limited to, a loudspeaker, a woofer, a sub-woofer, a tweeter, a wireless speaker, a wired speaker, a soundcard, a headphone, or other speakers or sound output device.

The video component may include suitable logic, circuitry, and interfaces that may be configured to display the visual notification (such as an abnormality status) to the user, based on the detected abnormality in each valve of the valve train 110. The video component may be a touch screen, which may enable a user to provide a user-input via the display component. The touch screen may be at least one of a resistive touch screen, a capacitive touch screen, or a thermal touch screen. In an embodiment, the display component may be communicably coupled to the apparatus 102 or the operator device 116, via the communication network 118. In another embodiment, the display component may be integrally formed in the apparatus 102, as the I/O device (as shown in FIG. 2). Examples of the display component may include, but are not limited to, at least one of: a liquid crystal display (LCD) display, a Light Emitting Diode (LED) display, a plasma display, or an Organic LED (OLED) display technology, or other display devices. In an embodiment, the display component may also refer to a display screen of a head-mounted device (HMD), a smart-glass device, a see-through display, a projection-based display, an electro-chromic display, or a transparent display.

The communication network 118 may include a communication medium through which the apparatus 102 and at least one of: the server 114, or the operator device 116, may communicate with each other. The communication network 118 may be one of a wired connection or a wireless connection. Examples of the communication network 118 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in a network environment of the apparatus 102 may be configured to connect to the communication network 118 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

Figure 3:
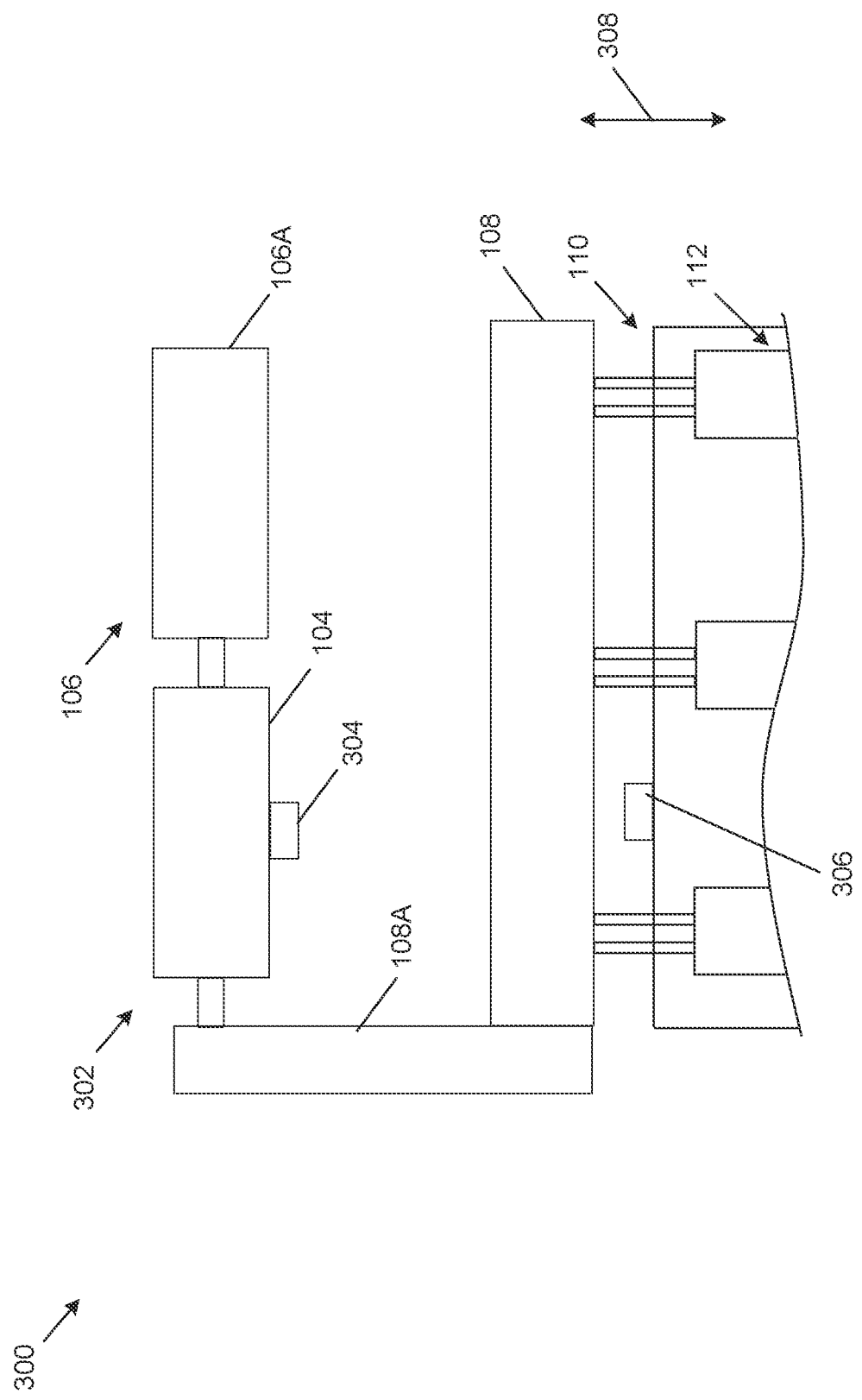
FIG. 3 is a diagram that illustrates an exemplary apparatus, in accordance with an embodiment of the disclosure.

In operation, the apparatus 102 may be a disposed on a floor (such as an assembly line of the manufacturing unit). In an embodiment, the apparatus 102 may be configured to detect the engine head 112 proximate the apparatus 102. For example, the apparatus 102 may detect the engine head 112 based on a detection of an RFID tag (as shown in FIG. 3) associated with the engine head 112. Based on the detection of the engine head 112 proximate the apparatus 102, the apparatus 102 may control the driving mechanism 106 to control the rotation of the external camshaft 108. In certain cases, the external camshaft 108 may be directly coupled to the valve train 110, which further controls the activation of each valve of the valve train 110 associated with the engine head 112. In certain cases, there may be a requirement to control a movement of the external camshaft 108, and selectively activate each valve of the valve train 110 to precisely determine an abnormal valve from the multiple valves of the valve train 110. In such cases, based on user requirements, the apparatus 102 may control the driving mechanism 106 to control at least one of: the position of the external camshaft, the velocity of the external camshaft, or the acceleration of the external camshaft, to precisely determine the abnormal valve from multiple valves of the valve train.

Based on the control of the rotation of the external camshaft 108 and corresponding activation of each valve of the valve train 110 associated with the engine head 112, the apparatus 102 may control the sensor 104 to acquire information associated with the activation of each valve of the valve train 110. The acquired information may include at least one of: a torque value or a force value associated with each valve of the valve train 110, which may be related to at least one of: a valve bore, a valve stem, a valve seat, a valve spring, a valve guide, a valve seal, a valve guide seal, a valve retainer, a cotter, or a lubrication associated with the valve train 110. In an embodiment, as there may not be any interconnecting element between the external camshaft 108 and the valve train 110, the apparatus 102 may control the sensor 104 to independently acquire the information associated with the activation of each valve of the valve train 110 based on the rotation of the external camshaft 108. Hence, each valve of the valve train may be independently tested for the abnormality.

Based on the acquired information, the apparatus 102 may further compare the acquired information (i.e. associated with the activation of each valve) with pre-stored information that may be stored in the apparatus 102 (or on the server 114), to determine the abnormality in each valve of the valve train 110. In an embodiment, the apparatus 102 may be configured to compare a waveform associated with the pre-stored information, with a waveform associated with the acquired information, and determine the abnormality based on the comparison. In an embodiment, the apparatus 102 may be configured to determine the abnormality in at least one of: a valve bore, a valve stem, a valve seat, a valve spring, a valve guide, a valve seal, a valve guide seal, a cotter, or a lubrication, or a valve retainer associated with each valve of the valve train 110.

Based on the determination of the abnormality, the apparatus 102 may generate the notification, which may relate to the determined abnormality in particular valve of the valve train 110. Based on the generation of the notification, the apparatus 102 may transmit the generated notification to the operator device 116 associated with the apparatus 102 or provide the notification to an operator (or the user of the apparatus 102). In an embodiment, the transmitted notification may include at least one of: the audible notification, the visual notification, or the tactile notification.

In an alternative embodiment, instead of coupling the engine head 112, the external camshaft 108 may be coupled to a part of a plurality of parts (not shown) associated with a machine (not shown). In such case, the apparatus 102 may control the driving mechanism 106 to control a rotation of the external camshaft 108 that may further control an activation of each part of the plurality of parts associated with the machine. The apparatus 102 may further control the sensor 104 to acquire information associated with the activation of each part of the plurality of parts based on the rotation of the external camshaft 108. The apparatus 102 may further compare the acquired information with the pre-stored information, to determine the abnormality in each part of the plurality of parts. Based on the determined abnormality, the apparatus 102 may generate a notification, which may relate to the determined abnormality in particular part of the machine. In an embodiment, the part may be the valve, and the machine may include at least one of: an exercising machine, a metering device, a laundry machine, or a medical instrument.

FIG. 2 is a block diagram of the apparatus of FIG. 1, in accordance with an embodiment of the disclosure. FIG. 2 is explained in conjunction with elements from FIG. 1. With reference to FIG. 2, there is shown a block diagram 200 of the apparatus 102. The apparatus 102 may include circuitry 202, a memory 204, a I/O device 206, a network interface 208, and the sensor 104.

The circuitry 202 may include suitable logic, circuitry, and/or interfaces that may be configured to execute program instructions associated with different operations to be executed by the apparatus 102. For example, some of the operations may include, but are not limited to, control of the driving mechanism 106 to control a rotation of the external camshaft 108 that may further control the activation of each valve of the valve train 110 associated with the engine head 112, control of the sensor 104 to acquire information associated with the activation of each valve of the valve train 110 based on the rotation of the external camshaft 108, comparison of the acquired information with pre-stored information, determination of the abnormality in each valve of the valve train 110, and generation of the notification based on the comparison. The execution of operations is further described, for example, in FIGS. 4A-4C.

The circuitry 202 may include any suitable special-purpose or general-purpose computer, computing entity, or processing device including various computer hardware or software modules and may be configured to execute instructions stored on any applicable computer-readable storage media (for example, the memory 204). The circuitry 202 may be implemented based on several processor technologies known in the art. For example, the circuitry 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. The circuitry 202 may include any number of processors that may be configured to, individually or collectively, perform any number of operations of the apparatus 102, as described in the present disclosure. Examples of the apparatus 102 may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors.

The memory 204 may include suitable logic, circuitry, interfaces, and/or code that may be configured to store the set of instructions executable by the circuitry 202. In an embodiment, the memory 204 may be configured to store acquired information associated with the activation of each valve of the valve train 110, the pre-stored information that may relates to the waveform of the standard valve train assembly that may be preset by the user, and information associated with the generated notification. Examples of implementation of the memory 204 may include, but are not limited to, Random Access Memory (RAM), Read Only Memory (ROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive user inputs and may render output (for example, via the operator device 116) in response to the received user inputs. In an embodiment, the I/O device 206 may be integrally coupled to the apparatus 102 to receive the user inputs and may render output (for example, via the operator device 116) in response to the received user inputs. In another embodiment, the I/O device 206 may be communicably coupled to the apparatus 102 to receive the user inputs and may render output, via the communication network 118. In some embodiments, the I/O device 206 may include the operator device 116. In other embodiment, the I/O device 206 may include various input and output devices that may be configured to communicate with the circuitry 202. Examples of the such input and output devices may include, but are not limited to, a touch screen, a touch pad, a keyboard, a mouse, a joystick, a microphone, a display device, a speaker, an infotainment system, or an image sensor.

The network interface 208 may include suitable logic, circuitry, and interfaces that may be configured to facilitate communication between the circuitry 202 and external devices (such as the server 114 or the operator device 116), via the communication network 118. The network interface 208 may be implemented by use of various technologies to support wired or wireless communication of the apparatus 102 with the communication network 118. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

A person of ordinary skill in the art will understand that the apparatus 102 may also include other suitable components or systems, in addition to the components or systems which are illustrated. A detailed description for the other components or systems of the apparatus 102 has been omitted from the disclosure for the sake of brevity. Further, it may be noted that the present disclosure may be realized in hardware, or a combination of hardware and software. The present disclosure may be realized in a centralized fashion, in at least one computer system, or in a distributed fashion, where different elements may be spread across several interconnected computer systems. The functions or operations executed by the apparatus 102, as described in corresponding FIGS. 1 and 2, may be performed by the circuitry 202. Details of the execution of the operations, via the circuitry 202, are further provided, for example, in FIG. 4A-4C.

FIG. 3 is a diagram that illustrates an exemplary apparatus, in accordance with an embodiment of the disclosure. FIG. 3 is explained in conjunction with elements from FIGS. 1 and 2. With reference to FIG. 3, there is shown an exemplary view 300 of an apparatus 302. The functions of the apparatus 302 may be same as the functions of the apparatus 102 described, for example, in FIG. 1. Therefore, the description of the apparatus 102 is omitted from the disclosure for the sake of brevity. In an embodiment, the apparatus 302 may include a detection element 304 and the identification element 306.

The detection element 304 may include suitable logic, circuitry, and interfaces that may be configured to detect the valve train 110 associated with the engine head 112. In an embodiment, based on the detected valve train 110, the apparatus 302 may be configured to select a suitable camshaft for the corresponding valves of the valve train 110. In an embodiment, the detection element 304 may be a radio-frequency identification (RFID) scanner. The RFID scanner may scan a workspace of the apparatus 302 to detect the valve train 110. The RFID scanner is merely presented as an example of a type of the detection element 304. The apparatus 302 may also be configured to control any other type of the detection element 304 to detect the valve train 110 associated with the engine head 112. Examples of such types of the detection element 304 may include, but are not limited to, an optical sensor, an acoustic sensor, or an image sensor.

The identification element 306 may include suitable logic, circuitry, and interfaces that may be configured to transmit or convey information associated with the valve train 110. For example, the transmitted information may include information about a number of valves of the valve train 110, a part ID, or a component ID associated with valve train 110. In an embodiment, the identification element 306 may be selectively coupled to the engine head 112, based on the type of detection element 304. In an example, if the detection element 304 is an image sensor, then the identification element 306 may be a printed code, such as a barcode or a QR code. In another example, if the detection element 304 is the RFID scanner, then the identification element 306 is a radio-frequency identification (RFID) tag. In another example, if the detection element 304 is the optical sensor, then the identification element 306 may be an optical transmitter to provide the information associated with the valve train 110. In an embodiment, the detection element 304 may be coupled to the apparatus 302 and may read (i.e. scan or communicate with) the identification element 306, to detect information associated with the valve train 110 of the engine head 112.

In operation, the apparatus 302 may be configured to control the detection element 304 to detect the identification element 306 coupled to the engine head 112, to further determine the information associated with each valve of the valve train 110. Based on the determination, the apparatus 302 may selectively couple with the external camshaft 108. Details of such selective external camshafts are described further, for example, in FIGS. 5A-5C, 6A-6C, and 7A-7C. Further, based on the selection of the external camshaft 108, the apparatus 302 may control the driving mechanism 106 to control the rotation of the external camshaft 108 that further controls the activation of each valve of the valve train 110 associated with the engine head 112, along a first direction 308 (shown in FIG. 3). In an embodiment, the apparatus 302 may activate the actuator 106A associated with the driving mechanism 106. The actuator 106A may include at least one of: the stepper motor, the servomotor, or the induction motor; and may control at least one of: the position of the external camshaft 108, the velocity of the external camshaft 108, or the acceleration of the external camshaft 108, based on the activation of the at least one of: the stepper motor, the servomotor or the induction motor associated with the driving mechanism 106.

Based on the activation, the apparatus 302 may further control the sensor 104 to acquire the information associated with the activation of each valve of the valve train 110 based on the rotation of the external camshaft 108. Upon acquisition, the apparatus 302 may compare the acquired information with the pre-stored information (i.e. predefined acceptable threshold values or signal waveform), to determine the abnormality in each valve of the valve train 110 and generate the notification based on the comparison. Details of the operations of the apparatus 302 are further described, for example, in FIGS. 4A-4C.

Figure 4A:
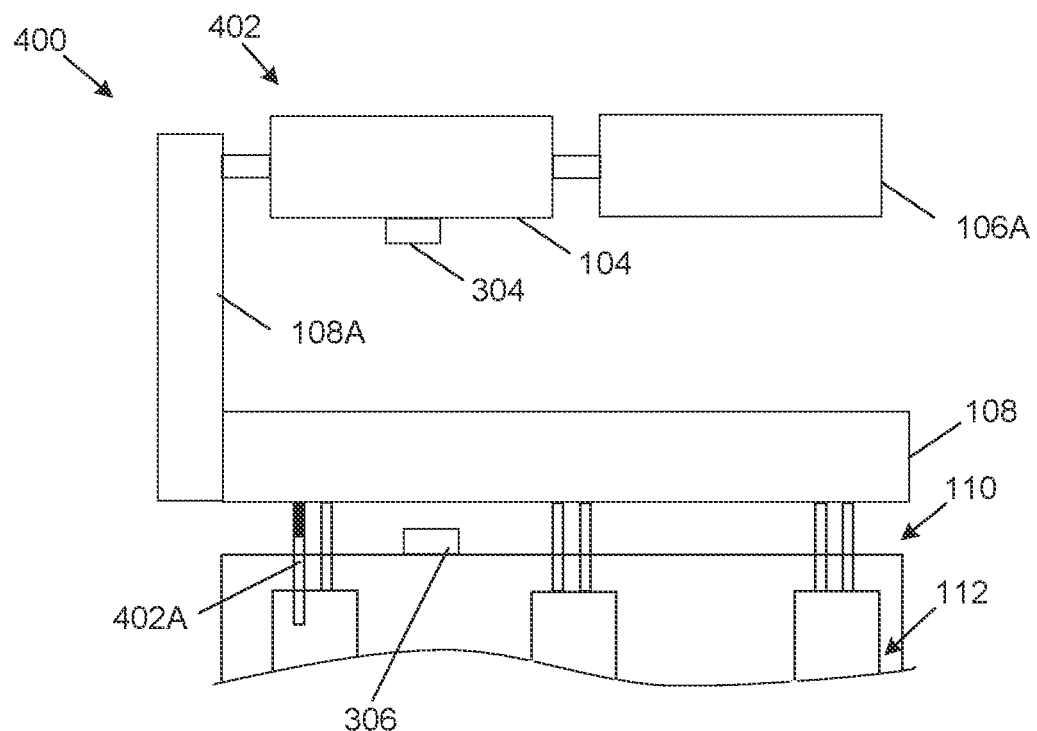
FIGS. 4A-4C are diagrams that collectively illustrate exemplary operations of the apparatus of FIGS. 1-3, in accordance with an embodiment of the disclosure.
Figure 4B:
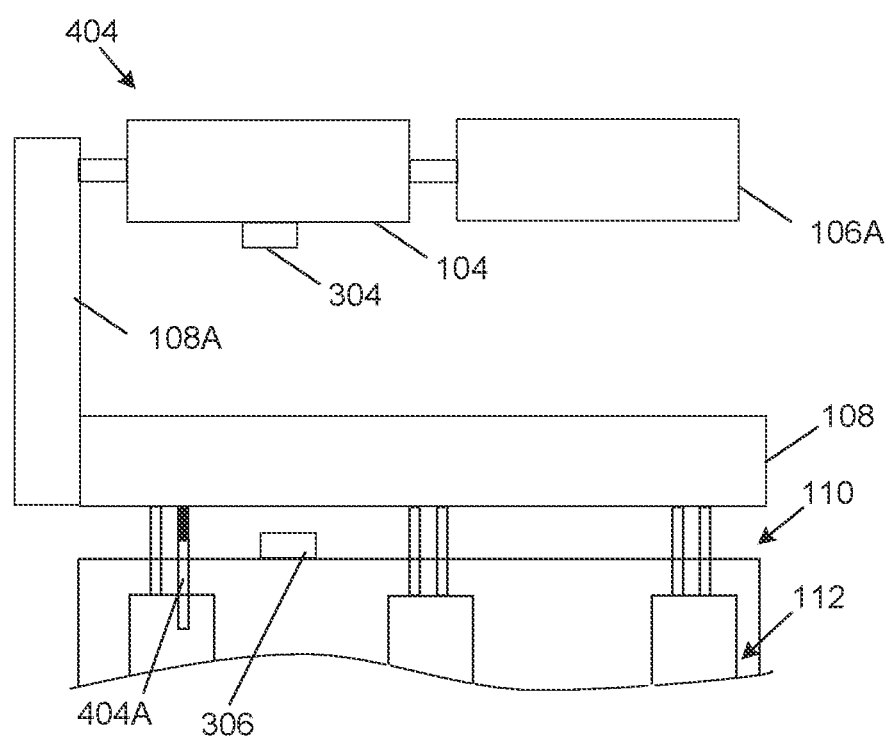
Figure 4C:
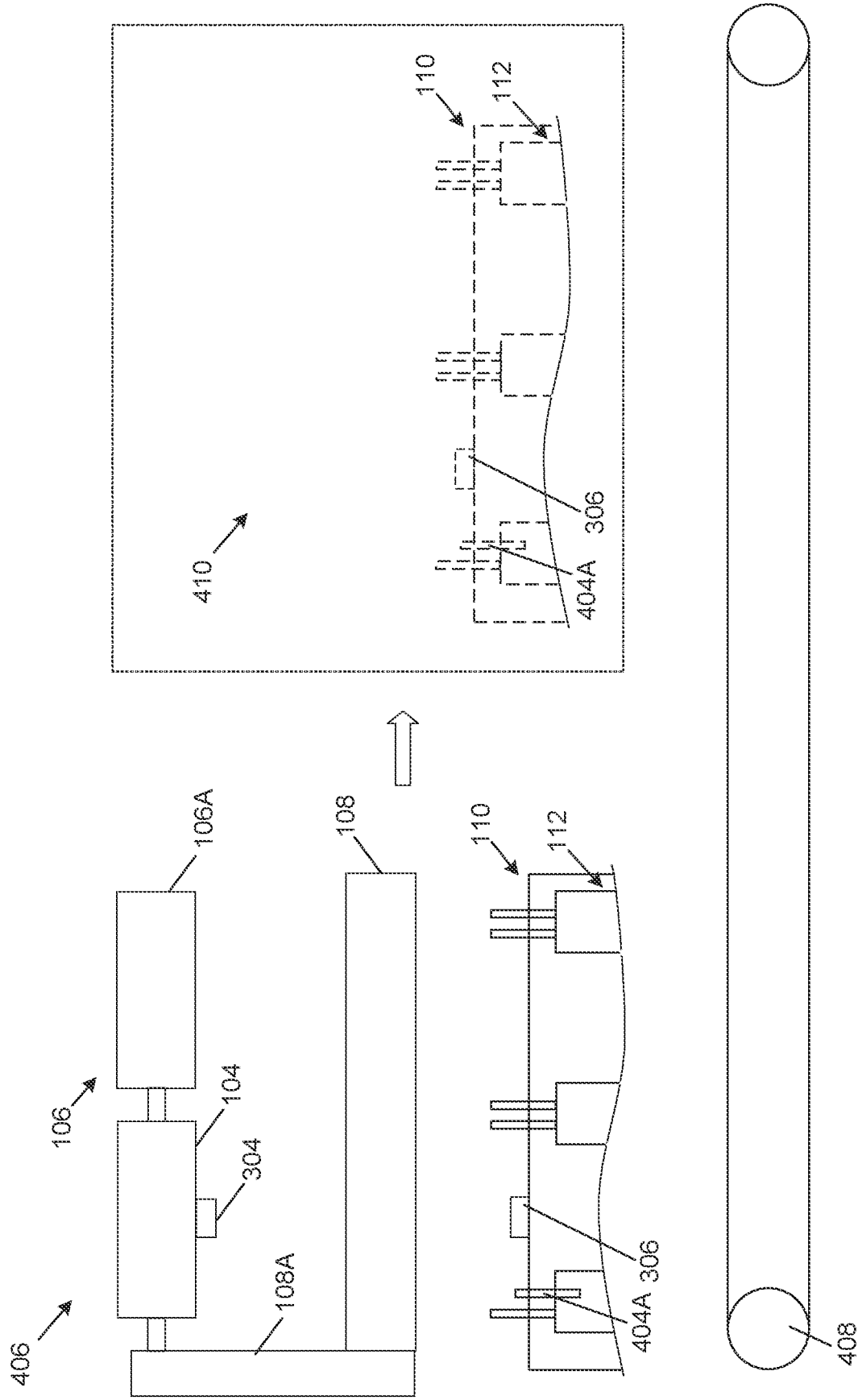

FIGS. 4A-4C are diagrams that collectively illustrate exemplary operations of the apparatus of FIG. 3, in accordance with an embodiment of the disclosure. FIGS. 4A-4C is explained in conjunction with elements from FIGS. 1, 2 and 3. With reference to FIGS. 4A-4C, there is shown an exemplary view 400 of a set of operations of the apparatus 302. The set of operations may include, but are not limited to, a first valve actuation operation 402, a second valve actuation operation 404, and a diagnostic operation 406. The described operations may also be performed by the apparatus 102, or the circuitry 202

In the first valve actuation operation 402 (i.e. referred in FIG. 4A), the apparatus 302 may control the driving mechanism 106 to control the rotation of the external camshaft 108 that may further control an activation of a first valve 402A of the valve train 110 associated with the engine head 112. The apparatus 302 may further control the sensor 104 to acquire the information associated with the activation of the first valve 402A of the valve train 110 based on the rotation of the external camshaft 108. In an embodiment, the sensor 104 may be disposed between the driving mechanism 106 and the external camshaft 108. The acquired information may relate to a torque value or a force value associated with the first valve 402A. In some embodiments, the information may be acquired over a predefined period of time (in seconds or milliseconds). In such case, the acquired information may correspond to a waveform, where the waveform may include the values of the torque or force values (i.e. associated with the first valve 402A) acquired for the predefined period of time. The apparatus 302 may further compare the acquired information with pre-stored information, to determine the abnormality in the first valve 402A of the valve train 110. The pre-stored information may correspond to one or more predefined threshold values (i.e. related to torque or force values) indicating certain limits till which a particular valve of the valve train 110 may be operating in a normal manner. In some embodiments, the pre-stored information may also correspond to a waveform (or a signal). In such case, the apparatus 302 may compare the waveforms related to the acquired information and the pre-stored information to determine the abnormality in the first valve 402A of the valve train 110. In case the first valve 402A is correctly installed in the engine head 112, without any abnormality, the acquired information may be within the certain limits mentioned by the pre-stored information. In such case, the apparatus 302 may generate the notification, which may relate to a successful installation of the first valve 402A. In an embodiment, the apparatus 302 may transmit the generated notification to the operator device 116. In an example, the operator device 116 may control the display component to display a message (such as "Successfully First Valve is Installed") that relates to the successful installation of the first valve 402A, and the apparatus 302 proceeds to the second valve actuation operation 404.

In the second valve actuation operation 404 (i.e. referred in FIG. 4B), the apparatus 302 may control the driving mechanism 106 to control the rotation of the external camshaft 108 that may further control an activation of a second valve 404A of the valve train 110 associated with the engine head 112. The apparatus 302 may further control the sensor 104 to acquire the information associated with the activation of the second valve 404A of the valve train 110 based on further rotation of the external camshaft 108. The apparatus 302 may further compare the acquired information with the pre-stored information (i.e. threshold limits), to determine the abnormality in the second valve 404A of the valve train 110. In case the second valve 404A has an abnormality (i.e. for example the acquired information (or torque/force values) exceeds the threshold limits), the apparatus 302 may generate the notification, which may relate to an incomplete or incorrect installation of the second valve 404A. In an embodiment, the apparatus 302 may transmit the generated notification to the operator device 116. In an example, the operator device 116 may control the display component to display a message (such as "Second Valve is Abnormal. Please Check!") that relates to the incomplete or incorrect installation of the second valve 404A and may proceed to the diagnostics operation 406 for the determined abnormality of a particular valve (like second valve 404A).

In the diagnostic operation 406 (i.e. referred in FIG. 4C), for example, based on the determination of the abnormality, the apparatus 302 may be configured to control a Radio Frequency Identification (RFID) tag (i.e., the identification element 306) coupled to the engine head 112. In an embodiment, if at least one valve (for example, the first valve 402A and/or the second valve 404A) of the valve train 110 is determined with the abnormality, then the apparatus 302 may control (or communicate with) the RFID tag to record information associated with the determined abnormality. The recorded information with the valve train 110 may further indicate to an operator (or to a person associated with a diagnostic process or department) that the valve train 110 may be faulty or certain valve(s) in the valve train 110 may be abnormal.

In an embodiment, the apparatus 302 may be further configured to generate assistance information. The assistance information relates to one or more instructions for further processing or action for the engine head 112. In an example, the assistance information may relate to a removal of the engine head 112 from the apparatus 302, in case the apparatus 302 could not detect any abnormality in the valve train 110 of the engine head 112. In another example, in case the apparatus 302 detects the abnormality in the valve train 110 of the engine head 112, the assistance information may relate to a control of a conveyor belt 408 associated with the assembly line to move the engine head 112 with the RFID tag (i.e., the identification element 306 indicating abnormality in the valve train 110) to a diagnostic center 410, to further determine or analyze a fault (i.e., the abnormality) in the valve train 110 of the engine head 112. In an embodiment, the abnormality may be associated with at least one of: the valve bore, the valve stem, the valve seat, the valve spring, valve guide, a valve seal, a valve guide seal, the valve retainer, a cotter, or a lubrication associated with each valve (such as the first valve 402A, or the second valve 404A) of the valve train 110. In an embodiment, the apparatus 302 may selectively couple to one of a plurality of implementations of external camshafts (such as the external camshaft 108), based on the user requirements. Details of such modification or implementations in the external camshaft 108 are further described, for example, in FIGS. 5A-5C, 6A-6C, and 7A-7C.

Figure 5A:
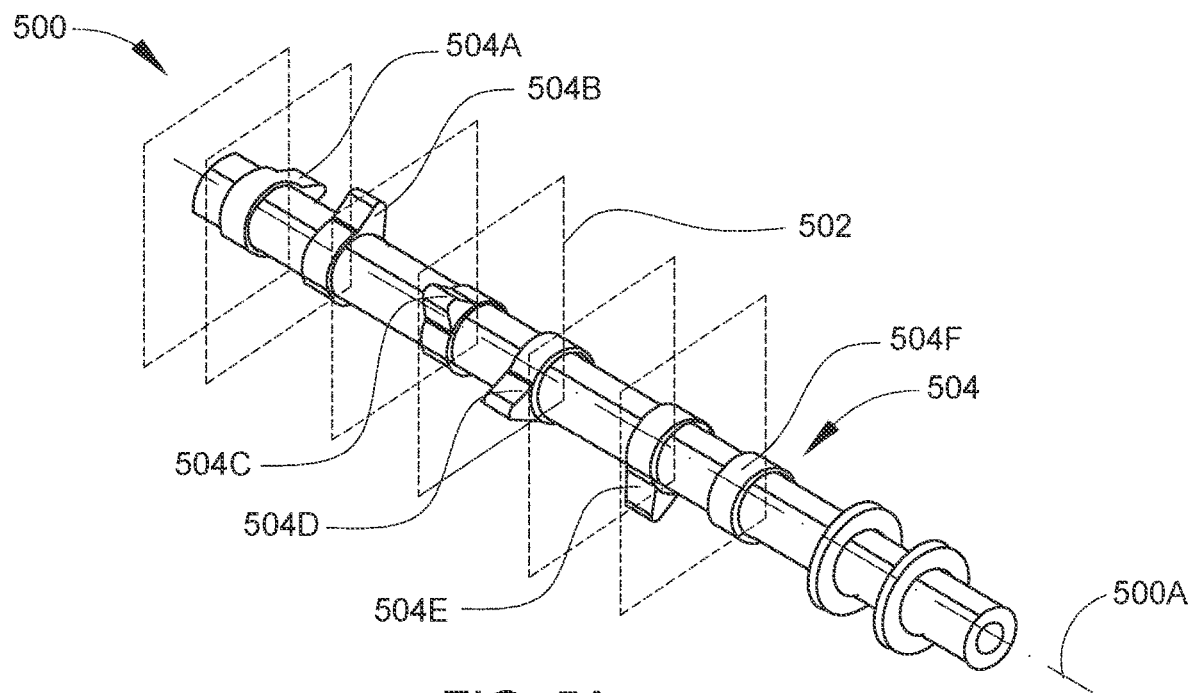
FIGS. 5A-5C are diagrams that collectively illustrate a first implementation of an external camshaft of the apparatus of FIG. 1, in accordance with an embodiment of the disclosure.
Figure 5B:
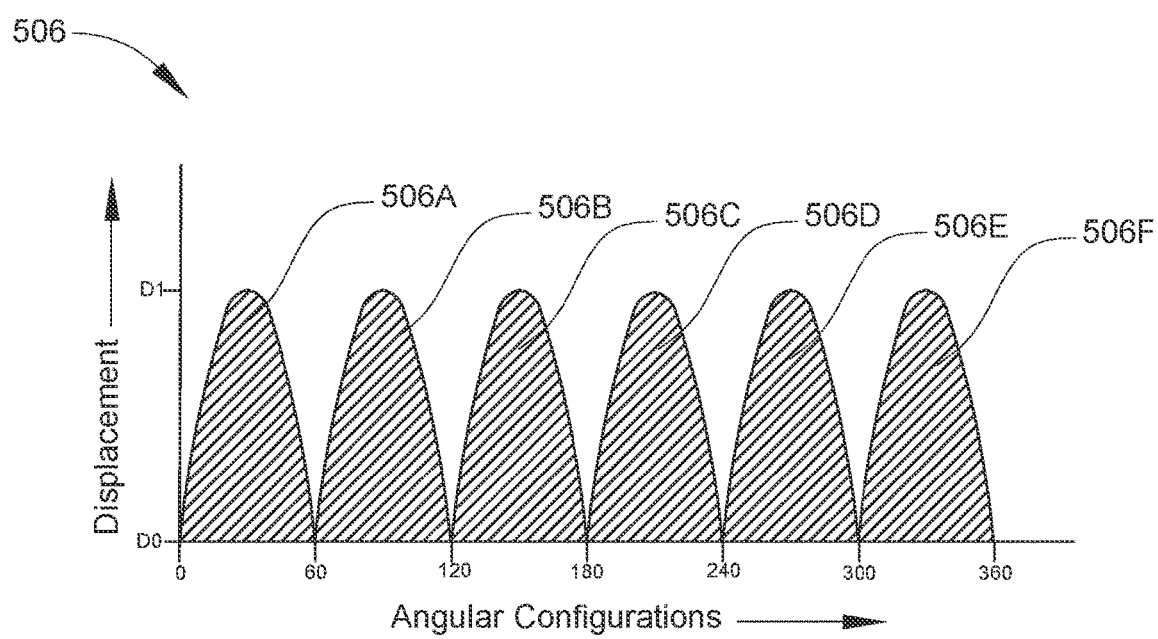
Figure 5C:
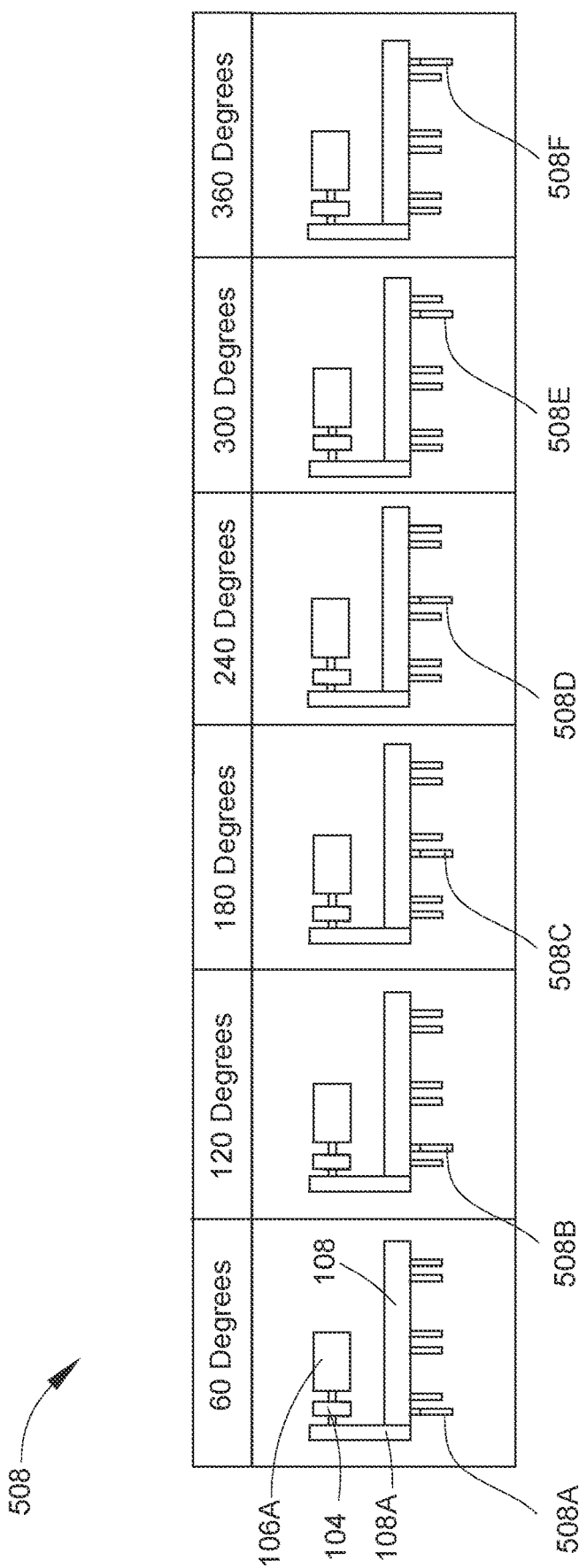

FIGS. 5A-5C are diagrams that collectively illustrate a first implementation of an external camshaft of the apparatus of FIG. 1, in accordance with an embodiment of the disclosure. FIGS. 5A-5C are explained in conjunction with elements from FIGS. 1, 2, 3, and 4A-4C. With reference to FIG. 5A, there is shown an isometric view 500 of the external camshaft 108. The external camshaft 108 may include a plurality of planes 502, which are disposed substantially perpendicular to an axis 500A of the external camshaft 108. In an embodiment, each plane of the plurality of planes 502 may be spaced from each other. The external camshaft 108 may further include a plurality of lobes 504, which includes a first lobe 504A, a second lobe 504B, a third lobe 504C, a fourth lobe 504D, a fifth lobe 504E, and a sixth lobe 504F. In an implementation, each lobe of the plurality of lobes 504 may be disposed in a particular plane of the plurality of planes 502.

Further referring to FIG. 5A, the plurality of lobes 504 of the external camshaft 108 may be equally indented (i.e. from the axis 500A of the external camshaft 108) at different angular configurations (such as at every 60 degrees) in each plane of the plurality of planes 502 of the external camshaft 108. Each lobe (such the first lobe 504A, the second lobe 504B, the third lobe 504C, the fourth lobe 504D, the fifth lobe 504E, or the sixth lobe 504F) of the plurality of lobes 504 may have a first profile (such as a pear shape) and configured to activate corresponding valve (such as the first valve 402A or the second valve 404A) of the valve train 110 (shown in FIGS. 1 and 4A-4B) at different angular configurations (such as at 60 degrees, or at 120 degrees, and/or at 180 degrees, and/or at 240 degrees, and/or at 300 degrees, and/or at 360 degrees) of the external camshaft 108, based on the rotation of the external camshaft 108. For example, at every 60 degrees of rotation of the external camshaft 108, a corresponding valve (such as the first valve 402A or the second valve 404A) of the valve train 110 may be activated. Therefore, in such configuration of the external camshaft 108, it may be observed that each valve (such as the first valve 402A or the second valve 404A) of the valve train 110 may be independently tested for the abnormality. Based on independent testing of each valve of the valve train 110, each valve (such as the first valve 402A or the second valve 404A) may be selectively adjusted based on the detected abnormality on each valve of the valve train 110. Such selective adjustment may enhance a quality of an assembly of the valve train 110 on the engine head 112. It may be noted that the six number of lobes shown in FIG. 5A is presented merely as an example. The plurality of lobes 504 may include less than six or more than six number of lobes, without deviation from the scope of the disclosure.

Referring to FIG. 5B, there is shown a valve displacement chart 506. The valve displacement chart 506 may be plotted between angular configurations of the external camshaft 108 versus the displacement of the plurality of engagement members that causes the activation of the valves (such as the first valve 402A or the second valve 404A) of the valve train 110. The plurality of engagement members may be configured to receive a rotational force from the external camshaft 108 and transmit the received rotational force as a linear force on each of the valve of the valve train 110, to activate each valve. For example, the plurality of engagement members may include a first end and a second end. The first end may be coupled to corresponding lobe of the plurality of lobes 504 of the external camshaft 108 and the second end may be coupled to the corresponding valve of the valve train 110. In other words, each member of plurality of engagement members may be disposed between each lobe of the plurality of lobes 504 of the external camshaft 108 and corresponding valve of the valve train 110 of the engine head 112. Based on the rotation of the external camshaft 108, each member of the plurality of engagement members may be controlled to be further translated towards the corresponding valve of the valve train 110, to further control the activation of the corresponding valve of the valve train 110 associated with the engine head 112.

For example, co-pending patent application U.S. Ser. No. 17/346,148, filed on the same date as the present application and entitled VALVE TESTING APPARATUS, which is incorporated herein by reference in its entirety, discusses the plurality of engagement members in detail. It may be noted that the plurality of engagement members discussed by the referenced application is merely an example. Although, there may be different other examples or illustrations for the plurality of engagement members, without departure from the scope of the disclosure.

As shown in FIG. 5B, for example, the angular configurations of the external camshaft 108 may be plotted along an X-axis of the valve displacement chart 506 and the displacement of the plurality of engagement members may be plotted along a Y-axis of the valve displacement chart 506. Based on the valve displacement chart 506, it may be observed that, at every 60 degrees of rotation (such as at 60 degrees, or at 120 degrees, and/or at 180 degrees, and/or at 240 degrees, and/or at 300 degrees, and/or at 360 degrees) of the external camshaft 108, there may be a change in the displacement of the plurality of engagement members. For example, when the first lobe 504A of the external camshaft 108 is disposed at 0 degrees, a first member (not shown) of the plurality of engagement members may be disposed at an initial displacement D0 in the apparatus 102.

In operation, when the first lobe 504A of the external camshaft 108 is rotated, the first member of the plurality of engagement members may be translated from the initial displacement D0. Based on further rotation (for example, at 30 degrees) of the first lobe 504A of the external camshaft 108, the first member of the plurality of engagement members may be further translated to a maximum displacement D1. When the first member of the plurality of engagement members reaches the maximum displacement D1, a valve (such as the first valve 402A) of the valve train 110 may be activated. Further, based on the activation of the valve, the apparatus 102 may be configured to test the abnormality associated with the valve of the valve train 110 based on the information (i.e. torque or force values) acquired by the sensor 104 as described, for example, in FIGS. 1 and 4A-4B. Based on the determination of the abnormality, the apparatus 102 may further transmit the notification about the abnormality to the user/operator, via the operator device 116 (such as a speaker, a display unit, a lighting unit, or a vibration motor).

Based on the transmission of the notification, the apparatus 102 may further control the driving mechanism 106 to further control the rotation of the first lobe 504A of the plurality of lobes 504 of the external camshaft 108. Based on the continued rotation of the first lobe 504A, the first member of the plurality of engagement members may be further retracted from the maximum displacement D1. Based on further rotation (for example, at 60 degrees) of the first lobe 504A of the external camshaft 108, the first member of the plurality of engagement members may be further retracted to the initial displacement D0. When the first member of the plurality of engagement members reaches the initial displacement D0, the valve (such as the first valve 402A) of the valve train 110 may be reset. In an embodiment, the activation and/or the reset of the valve may be modified based on a change in the structural profile (such as a circular shape, a pear shape, a snail shape, etc.) of the first lobe 504A or a change in a structural preference (such as a change in height) of the first member of the plurality of engagement members. In the valve displacement chart 506, the activation and/or the reset of the first valve 402A may be depicted as a first valve displacement 506A. The first valve displacement 506A may be an area that relate to a displacement profile of the valve (such as the first valve 402A) of the valve train 110, which may include information associated with a translation of the valve and a retraction of the valve of the valve train 110.

Based on the reset of the valve (such as the first valve 402A) of the valve train 110, the apparatus 102 may be further configured to control the rotation (for example, from 60 degrees to 120 degrees) of the second lobe 504B of the plurality of lobes 504 of the external camshaft 108. Based on the rotation of the second lobe 504B, the apparatus 102 may be configured to translate a second member (not shown) of the plurality of engagement members to activate a second valve (such as the second valve 404A) of the valve train 110, to form a second valve displacement 506B. Upon activation of the second valve, the apparatus 102 may be configured to reset the second valve (such as the second valve 404A). Based on the reset of the second valve, the apparatus 102 may be further configured to control the rotation (for example, from 120 degrees to 180 degrees) of the third lobe 504C of the plurality of lobes 504 of the external camshaft 108. Based on the rotation of the third lobe 504C, the apparatus 102 may be configured to translate a third member (not shown) of the plurality of engagement members to activate a third valve of the valve train 110, to form a third valve displacement 506C. Similarly, a fourth valve of the valve train 110 may be activated based on the rotation (for example, from 180 degrees to 240 degrees) of the fourth lobe 504D to form a fourth valve displacement 506D, a fifth valve of the valve train 110 may be activated based on the rotation (for example, from 240 degrees to 300 degrees) of the fifth lobe 504E to form a fifth valve displacement 506E, a sixth valve of the valve train 110 may be activated based on the rotation (for example, from 300 degrees to 360 degrees) of the sixth lobe 504F, to form a sixth valve displacement 506F. From the valve displacement chart 506, it may be observed that all valves of the valve train 110 may be uniformly activated at the maximum displacement D1. Therefore, as the apparatus 102 facilitates a uniform displacement of all members of the plurality of engagement members and a subsequent uniform displacement of all valves of the valve train 110, there may be a stability in the apparatus 102.

Referring to FIG. 5C, there is shown a valve displacement implementation 508. In the valve displacement implementation 508, the apparatus 102 may include the driving mechanism 106 that may be coupled with the plurality of engagement members, which may be further coupled with the valves (such as a primary valve 508A (i.e., the first valve 402A), a secondary valve 508B (i.e., the second valve 404A), a third valve 508C, a fourth valve 508D, a fifth valve 508E, and a sixth valve 508F) of the valve train 110. The driving mechanism 106 may include the actuator 106A to control the rotation of the external camshaft 108 and translate each of the plurality of engagement members based on the rotation of the external camshaft 108. The translation of each of the plurality of engagement members may subsequently control the translation of the valves of the valve train 110. Based on the control of the actuator 106A, the valves of the valve train 110 may be actuated. For example, based on the rotation of the first lobe 504A and subsequent translation of the first member of the plurality of engagement members, the primary valve 508A may be actuated. The actuation of the primary valve 508A may be related to the first valve displacement 506A of the valve displacement chart 506, as shown in FIG. 5B. Similarly, based on the rotation of the second lobe 504B and subsequent translation of the second member of the plurality of engagement members, the secondary valve 508B may be actuated. The actuation of the secondary valve 508B may be related to the second valve displacement 506B of the valve displacement chart 506, as shown in FIG. 5B, and vice versa for at least one of: the third valve 508C, the fourth valve 508D, the fifth valve 508E, and the sixth valve 508F actuations, based on different angular configurations of the external camshaft 108. In another embodiment, the external camshaft 108 may also be configured to activate all valves at once. Details of such configuration of the camshaft are further described, for example, in FIGS. 6A-6C.

Figure 6A:
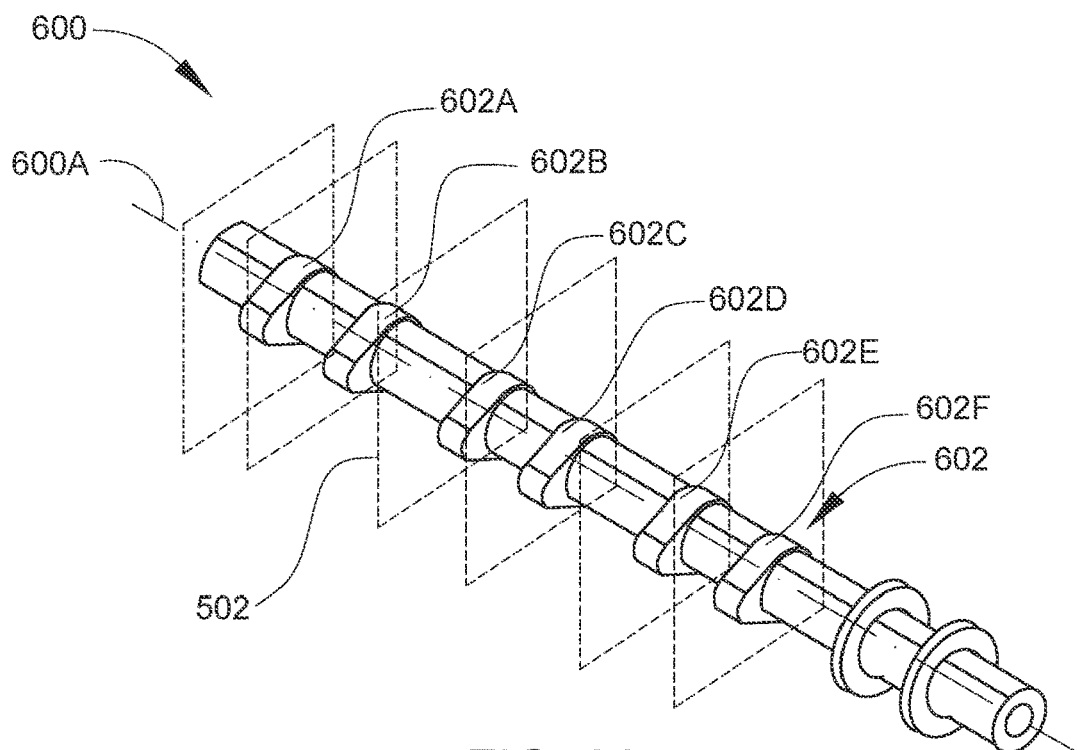
FIGS. 6A-6C are diagrams that collectively illustrate a second implementation of an external camshaft of the apparatus of FIG. 1, in accordance with an embodiment of the disclosure.
Figure 6B:
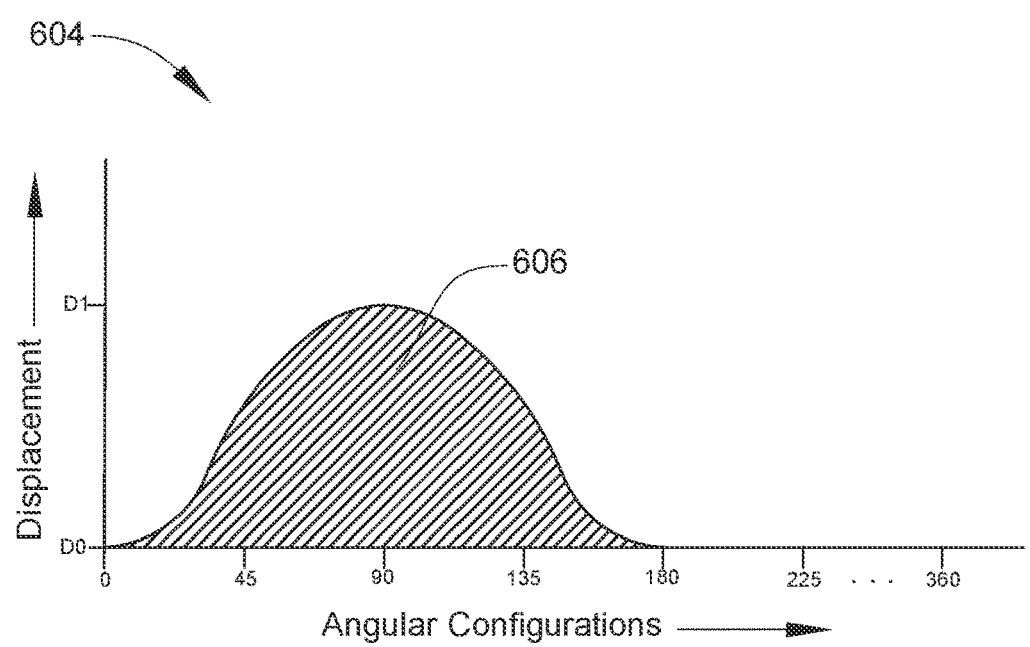
Figure 6C:
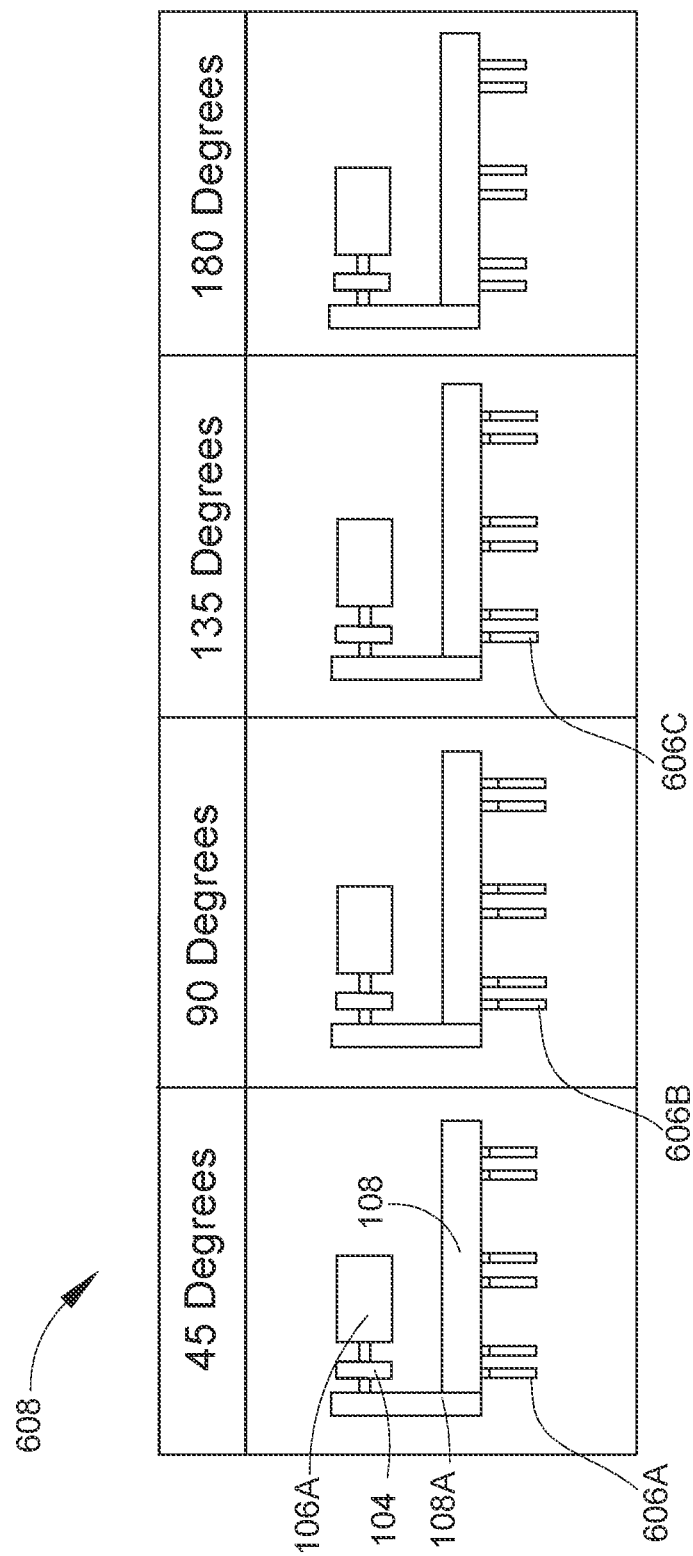

FIGS. 6A-6C are diagrams that collectively illustrate a second implementation of an external camshaft of the apparatus of FIG. 1, in accordance with an embodiment of the disclosure. FIGS. 6A-6C are explained in conjunction with elements from FIGS. 1, 2, 3, 4A-4C, and FIGS. 5A-5C. With reference to FIG. 6A, there is shown an isometric view 600 of a second implementation of the external camshaft 108. The external camshaft 108 may include the plurality of planes 502, which are disposed substantially perpendicular to an axis 600A of the external camshaft 108. In an embodiment, each plane of the plurality of planes 502 may be equally spaced from each other. The external camshaft 108 may further include a plurality of lobes 602, which includes a first lobe 602A, a second lobe 602B, a third lobe 602C, a fourth lobe 602D, a fifth lobe 602E, and a sixth lobe 602F. In an implementation, each lobe of the plurality of lobes 602 may be disposed in a particular plane of the plurality of planes 502.

Further referring to FIG. 6A, the plurality of lobes 602 of the external camshaft 108 may be disposed at a fixed angle (such as at 90 degrees), from the axis 600A of the external camshaft 108, in each plane of the plurality of planes 502 of the external camshaft 108. Each lobe (such as the first lobe 602A or the second lobe 602B) of the plurality of lobes 602 may have a second profile (such as an eight-power polynomial single lobe) and configured to activate corresponding valve (such as the first valve 402A or the second valve 404A) of the valve train 110 at a fixed angular configuration (such as at 90 degrees) of the external camshaft 108, based on the rotation of the external camshaft 108. For example, at a specific degree (such as 90 degrees) of rotation of the external camshaft 108, all valves of the valve train 110 may be simultaneously actuated. Further, in such configuration of the external camshaft 108, it may be observed that, due to the eight-power polynomial single lobe profile of each lobe of the plurality of lobes 602, each valve of the valve train 110 may be configured to slowly actuate (such as a 8th order polynomial lift) with a high precision. For example, based on the slow actuation, each valve of the valve train may be tested at each frames of rotation of the external camshaft 108 with the high precision. Therefore, in such configuration of the external camshaft 108, it may be observed that each valve of the valve train 110 may be tested for the abnormality with the high precision. Such high precision in testing of the valves may improve machine life (such as an engine life) and further enhance the quality of the valve train 110 assembly on the engine head 112.

Referring to FIG. 6B, there is shown a valve displacement chart 604. The valve displacement chart 604 may be plotted between angular configurations of the external camshaft 108 versus the displacement of the plurality of engagement members that causes the activation of all the valves (such as the first valve 402A or the second valve 404A) of the valve train 110. For example, the angular configurations of the external camshaft 108 may be plotted along an X-axis of the valve displacement chart 604 and the displacement of the plurality of engagement members may be plotted along a Y-axis of the valve displacement chart 604. Based on the valve displacement chart 604, it may be observed that, from 0 degrees to 180 degrees of rotation of the external camshaft 108, there may be a change in the displacement of the plurality of engagement members. For example, when each lobe (such as the first lobe 602A, the second lobe 602B, the third lobe 602C, the fourth lobe 602D, the fifth lobe 602E, or the sixth lobe 602F) of the plurality of lobes 602 of the external camshaft 108 is disposed at 0 degrees, all members of the plurality of engagement members may be disposed at the initial displacement D0 in the apparatus 102.

In operation, when each lobe (such as the first lobe 602A, the second lobe 602B, the third lobe 602C, the fourth lobe 602D, the fifth lobe 602E, or the sixth lobe 602F) of the plurality of lobes 602 of the external camshaft 108 is rotated, all the members of the plurality of engagement members may be translated from the initial displacement D0. Based on further rotation (for example, at 90 degrees) of each lobe (such as the first lobe 602A, the second lobe 602B, the third lobe 602C, the fourth lobe 602D, the fifth lobe 602E, or the sixth lobe 602F) of the plurality of lobes 602 of the external camshaft 108, all the members of the plurality of engagement members may be further translated to the maximum displacement D1. When all the members of the plurality of engagement members reaches the maximum displacement D1, all valves (such as the first valve 402A or the second valve 404A) of the valve train 110 may be slowly activated with a precision.

Based on the activation of all valves of the valve train 110 slower than a normal speed, the apparatus 102 may be configured to precisely determine the abnormality associated with each valve of the valve train 110 based on the information (i.e. torque or force) acquired by the sensor 104 as described, for example, in FIGS. 1 and 4A-4B. Based on the determination of the abnormality, the apparatus 102 may further transmit the notification about the abnormality to the operator, via the operator device 116 (such as a speaker, a display unit, a lighting unit, or a vibration motor). Based on the transmission of the notification, the apparatus 102 may further configure the driving mechanism 106 to further control the rotation of each lobe (such as the first lobe 602A, the second lobe 602B, the third lobe 602C, the fourth lobe 602D, the fifth lobe 602E, or the sixth lobe 602F) of the plurality of lobes 602 of the external camshaft 108. Based on the continued rotation of the first lobe 504A, the first member of the plurality of engagement members may be further retracted from the maximum displacement D1. Based on further rotation (for example, at 180 degrees) of each lobe of the plurality of lobes 602 of the external camshaft 108, all the members of the plurality of engagement members may be further retracted to the initial displacement D0. When all members of the plurality of engagement members reach the initial displacement D0, all valves of the valve train 110 may be reset. In an embodiment, the activation and/or the reset of the first valve may be modified based on a change in the structural profile (such as a circular shape, a pear shape, a snail shape, etc.) of each lobe (such as the first lobe 602A, the second lobe 602B, the third lobe 602C, the fourth lobe 602D, the fifth lobe 602E, or the sixth lobe 602F) of the plurality of lobes 602 of the external camshaft 108, or a change in a structural preference (such as a change in height) of each member of the plurality of engagement members. In the valve displacement chart 604, the activation and/or the reset of each valve of the valve train 110 may be depicted as a valve displacement 606. The valve displacement 606 may be an area that relates to a displacement profile of each valve of the valve train 110, which includes information associated with a translation of each valve of the valve train 110 and the retraction of each valve of the valve train 110 for the second implementation of the external camshaft 108 shown in FIG. 6A. Based on the reset of all the valves of the valve train 110, the apparatus 102 may be further configured to control the rotation (for example, from 0 degrees to 180 degrees) for a second iteration of activation of each valve of the valve train 110. The second iteration of activation of each valve of the valve train 110 may also be identical to the valve displacement 606 shown in the valve displacement chart 604.

Referring to FIG. 6C, there is shown a valve displacement implementation 608. In the valve displacement implementation 608, the apparatus 102 may include the driving mechanism 106 that may be coupled with the plurality of engagement members, which may be coupled with the valves (such as the first valve 402A or the second valve 404A) of the valve train 110. The driving mechanism 106 may include the actuator 106A to control the rotation of the external camshaft 108 and subsequently control the translation of the valves of the valve train 110. Based on the control of the actuator 106A on the external camshaft 108, the valves of the valve train 110 may be actuated.

For example, based on the control of the actuator 106A, each lobe (such as the first lobe 602A, the second lobe 602B, the third lobe 602C, the fourth lobe 602D, the fifth lobe 602E, or the sixth lobe 602F) of the plurality of lobes 602 of the external camshaft 108 may be rotated. Based on the rotation of the plurality of lobes 602 of the external camshaft 108, the apparatus 102 may further configured to translate each member of the plurality of engagement members, and subsequently activate each valve of the valve train 110. The actuation of each valve of the valve train 110 may be related to the valve displacement 606 of the valve displacement chart 604, as shown in FIG. 6B.

Referring to FIG. 6C, it may be observed that, all valves of the valve train 110 may be actuated with the high precision. For example, based on an initial rotation (such as at 45 degrees) of each lobe (such as the first lobe 602A, the second lobe 602B, the third lobe 602C, the fourth lobe 602D, the fifth lobe 602E, or the sixth lobe 602F) of the plurality of lobes 602 of the external camshaft 108, all valves of the valve train 110 may be slowly displaced to a primary valve displacement 606A based on a slow displacement of all members of the plurality of engagement members from the initial displacement D0. Based on a continued rotation (such as at 90 degrees) of each lobe (such as the first lobe 602A, the second lobe 602B, the third lobe 602C, the fourth lobe 602D, the fifth lobe 602E, or the sixth lobe 602F) of the plurality of lobes 602 of the external camshaft 108, all valves of the valve train 110 may be slowly displaced to a secondary valve displacement 606B based on a slow displacement of all members of the plurality of engagement members from the initial displacement D0 to the maximum displacement D1. In an embodiment, the secondary valve displacement 606B may be higher than the primary valve displacement 606A, as shown in FIG. 6C.

Based on a further continued rotation (such as at 135 degrees) of each lobe (such as the first lobe 602A, the second lobe 602B, the third lobe 602C, the fourth lobe 602D, the fifth lobe 602E, or the sixth lobe 602F) of the plurality of lobes 602 of the external camshaft 108, all valves of the valve train 110 may be slowly retracted from the secondary valve displacement 606B to a tertiary valve displacement 606C, based on a slow displacement of all members of the plurality of engagement members from the maximum displacement D1 towards the initial displacement D0. In an embodiment, the tertiary valve displacement 606C may be lesser than the secondary valve displacement 606B, as shown in FIG. 6C.

Based on a further rotation (such as at 180 degrees) of each lobe (such as the first lobe 602A, the second lobe 602B, the third lobe 602C, the fourth lobe 602D, the fifth lobe 602E, or the sixth lobe 602F) of the plurality of lobes 602 of the external camshaft 108, all valves of the valve train 110 may be slowly displaced back to a reset position, based on a slow displacement of all members of the plurality of engagement members to the initial displacement D0. In another embodiment, the external camshaft 108 may also be configured to activate all valves for a plurality of occurrences. Details of such configuration of the camshaft are further described, for example, in FIGS. 7A-7C.

Figure 7A:
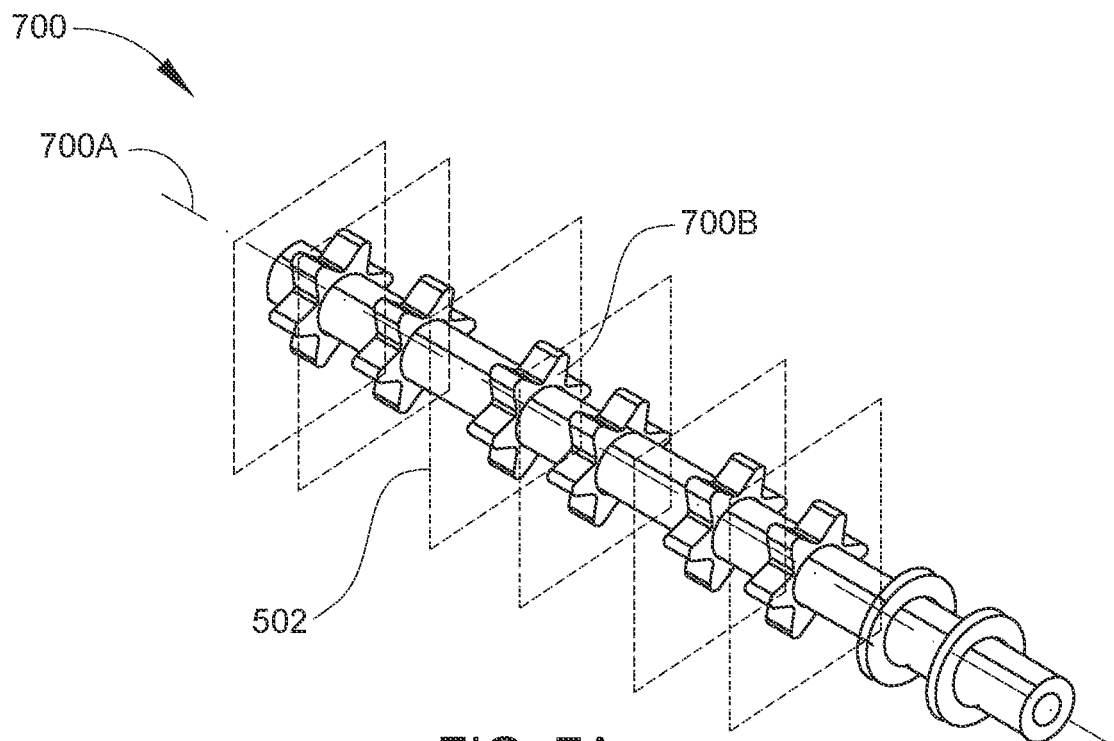
FIGS. 7A-7C are diagrams that collectively illustrate a third implementation of an external camshaft of the apparatus of FIG. 1, in accordance with an embodiment of the disclosure.
Figure 7B:
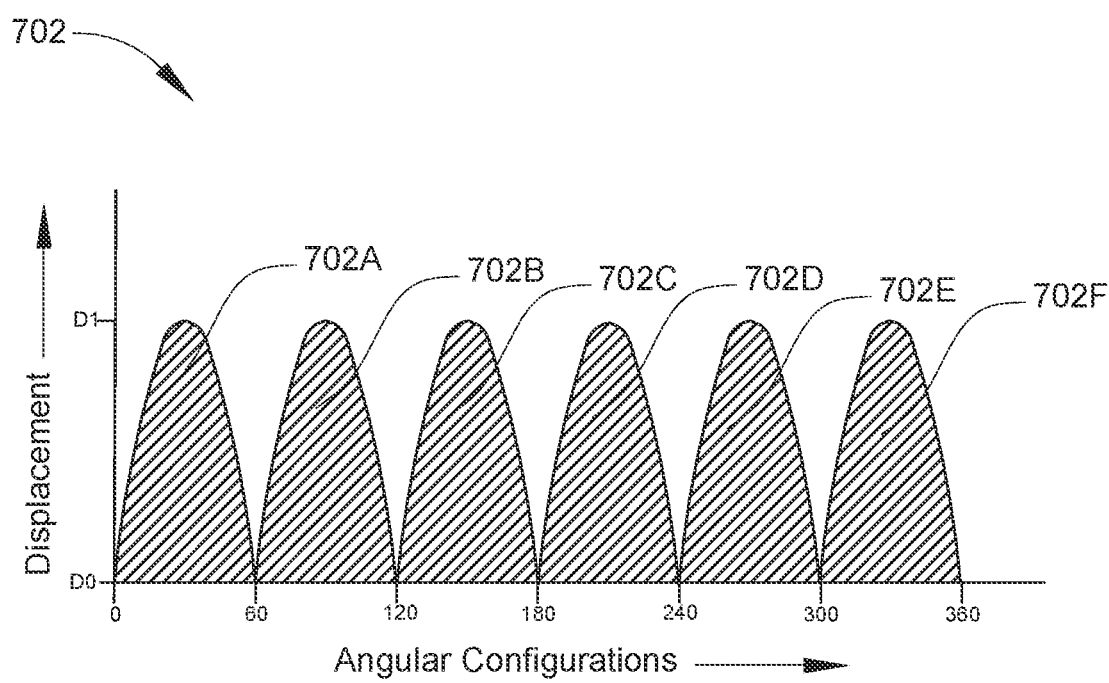
Figure 7C:
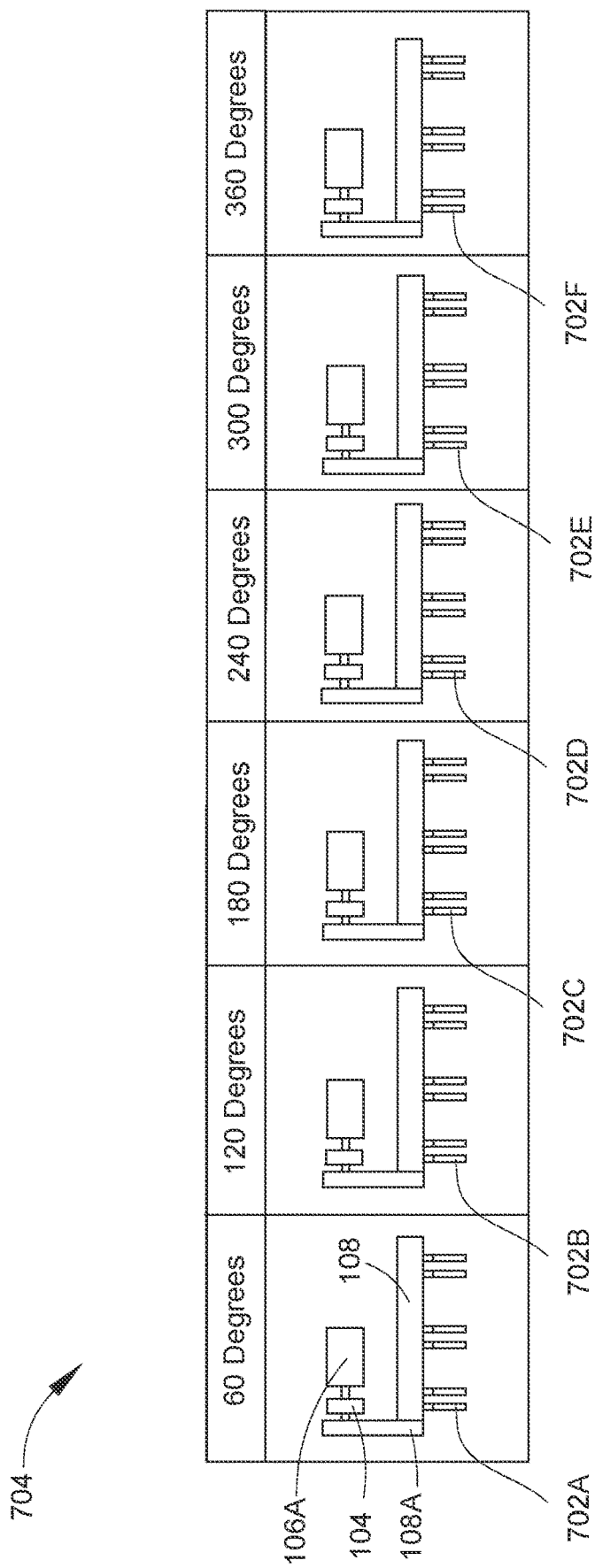

FIGS. 7A-7C are diagrams that collectively illustrate a third implementation of a camshaft of the apparatus of FIG. 1, in accordance with an embodiment of the disclosure. FIGS. 7A-7C are explained in conjunction with elements from FIGS. 1, 2, 3, 4A-4C, 5A-5C, and 6A-6C. With reference to FIG. 7A, there is shown an isometric view 700 of the external camshaft 108. The external camshaft 108 may include the plurality of planes 502, which are disposed substantially perpendicular to an axis 700A of the external camshaft 108. In an embodiment, each plane of the plurality of planes may be spaced from each other. The external camshaft 108 may further include a plurality of lobes 700B. In an implementation, each of the plurality of lobes 700B of the external camshaft 108 may be disposed in at a particular plane of the plurality of planes 502.

Further referring to FIG. 7A, each lobe of the plurality of lobes 700B may have a multilobe structure (such as a toothed gear profile) and configured to activate each valve (such as the first valve 402A or the second valve 404A) of the valve train 110 for a plurality of occurrences, based on the rotation of the external camshaft 108. In an example, the plurality of occurrences of the activation of each valve of the valve train 110, may be determined based on a number of the plurality of lobes 700B on each plane of the external camshaft 108. For example, in case there are six numbers of the plurality of lobes 700B on each plane of the external camshaft 108, there may be six occurrences of the activation of each valve of the valve train 110. In another example, in case there are more than six numbers of the plurality of lobes 700B on each plane of the external camshaft 108, there may be more than six occurrences of the activation of each valve of the valve train 110. Therefore, it may be observed that the occurrences of activation of each valve of the valve train 110 may be directly proportional to the number of the plurality of lobes 700B on each plane of the external camshaft 108.

In an implementation, at every 60 degrees of rotation of the external camshaft 108, all valves of the valve train 110 may be actuated simultaneously. Therefore, in such configuration of the camshaft, it may be observed that each valve of the valve train 110 may be tested for the plurality of occurrences to determine the abnormality based on the information (i.e. torque or force) acquired by the sensor 104 as described, for example, in FIGS. 1 and 4A-4B. Based on the plurality of occurrences, each valve of the valve train 110 may be redundantly tested, so that the apparatus 102 may precisely determine the abnormality in the assembly of the valve train 110 of the engine head 112. Further, as the external camshaft 108 has the multilobe structure, the plurality of occurrences of testing the valves of the valve train 110 may be performed with a minimum cycle time (such as a reduction in time that may be required to test each valve of the valve train 110).

Referring to FIG. 7B, there is shown a plurality of occurrences chart 702. The plurality of occurrences chart 702 may be plotted between angular configurations of the external camshaft 108 versus the displacement of the plurality of engagement members that causes the activation of the valves (such as the first valve 402A or the second valve 404A) of the valve train 110. For example, the angular configurations of the external camshaft 108 may be plotted along an X-axis of the plurality of occurrences chart 702 and the displacement of the plurality of engagement members may be plotted along a Y-axis of the plurality of occurrences chart 702. Based on the plurality of occurrences chart 702, it may be observed that, at every 60 degrees of rotation (such as at 60 degrees, or at 120 degrees, and/or at 180 degrees, and/or at 240 degrees, and/or at 300 degrees, and/or at 360 degrees) of the external camshaft 108, there may be a change in the displacement of the plurality of engagement members.

For example, when the plurality of lobes 700B of the external camshaft 108 is disposed at 0 degrees, all the members of the plurality of engagement members may be disposed at an initial displacement DO in the apparatus 102. In operation, when the plurality of lobes 700B of the external camshaft 108 is rotated, all the members of the plurality of engagement members may be translated from the initial displacement D0. Based on further rotation (for example, at 30 degrees) of the plurality of lobes 700B of the external camshaft 108, all the members of the plurality of engagement members may be further translated to a maximum displacement D1. When all members of the plurality of engagement members reaches the maximum displacement D1, each valve of the valve train 110 may be activated. Further, based on the activation of each valve of the valve train 110, the apparatus 102 may be configured to test the abnormality associated with each valve of the valve train 110 based on the information (i.e. torque or force) acquired by the sensor 104 and the pre-stored information (i.e. threshold limits) as described, for example, in FIGS. 1 and 4A-4B. Based on the determination of the abnormality, the apparatus 102 may further transmit the notification about the abnormality of each valve to the user, via the operator device 116 (such as a speaker, a display unit, a lighting unit, or a vibration motor).

Based on the transmission of the notification, the apparatus 102 may further configure the driving mechanism 106 to further control the rotation of the plurality of lobes 700B of the external camshaft 108. Based on the continued rotation of the plurality of lobes 700B, each member of the plurality of engagement members may be further retracted from the maximum displacement D1. Based on further rotation (for example, at 60 degrees) of the plurality of lobes 700B of the external camshaft 108, each member of the plurality of engagement members may be further retracted to the initial displacement D0. When the first member of the plurality of engagement members reaches the initial displacement DO, each valve of the valve train 110 may be reset. In an embodiment, the activation and/or the reset of the first valve may be modified based on a change in the structural profile (such as a change in dimension of a tooth of the toothed gear profile) of the plurality of lobes 700B or a change in a structural preference (such as a change in height) of each member of the plurality of engagement members.

In the plurality of occurrences chart 702, the activation and/or the reset of a first valve (such as the first valve 402A) may be depicted as a first occurrence displacement 702A. The first occurrence displacement 702A may be an area that relate to a displacement profile of the first valve 402A, which includes information associated with a translation of the first valve 402A and the retraction of the first valve 402A of the valve train 110. Similarly, the first valve 402A of the valve train 110 may be activated and retracted for the plurality of occurrences, based on the number of the plurality of lobes 700B of the external camshaft 108. In case there are six number of the plurality of lobes 700B on each plane, based on a completion of the first occurrence displacement 702A, the apparatus 102 may be further configured to perform activation and retraction of the first valve 402A for a second occurrence displacement 702B, a third occurrence displacement 702C, a fourth occurrence displacement 702D, a fifth occurrence displacement 702E, and a sixth occurrence displacement 702F, as shown in FIG. 7B.

Referring to FIG. 7C, there is shown a plurality of occurrences implementation 704. In the plurality of occurrences implementation 704, the apparatus 102 may include the driving mechanism 106 that may be coupled with the plurality of engagement members, which may be coupled with the valves of the valve train 110. The driving mechanism 106 may include the actuator 106A to control the rotation of the external camshaft 108 and subsequently control the activation of the valves of the valve train 110.

Based on the control of the actuator 106A on the plurality of lobes 700B of the external camshaft 108, each valve of the valve train 110 may be actuated for the plurality of occurrences. For example, based on the rotation of the plurality of lobes 700B and subsequent translation of the first member of the plurality of engagement members, each valve of the valve train 110 may be actuated. In an example, the first valve 402A may be actuated for the plurality of occurrences (such as the first occurrence displacement 702A, the second occurrence displacement 702B, the third occurrence displacement 702C, the fourth occurrence displacement 702D, the fifth occurrence displacement 702E, and the sixth occurrence displacement 702F), as shown in FIG. 4B. Similarly, based on the rotation of the plurality of lobes 700B of the external camshaft 108 and subsequent translation of a second member of the plurality of engagement members, the second valve 404A may be actuated for the plurality of occurrences. Similarly, based on the rotation of the plurality of lobes 700B of the external camshaft 108 and subsequent translation of at least one of: a third member, a fourth member, a fifth member, or a sixth member of the plurality of engagement members, corresponding at least one of: the third valve, the fourth valve, the fifth valve, or the sixth valve of the valve train 110 may be actuated for the plurality of occurrences respectively, and thus, improving the precision in testing of the abnormality based on the plurality of occurrences of the activation of each valve of the valve train 110.

Figure 8:
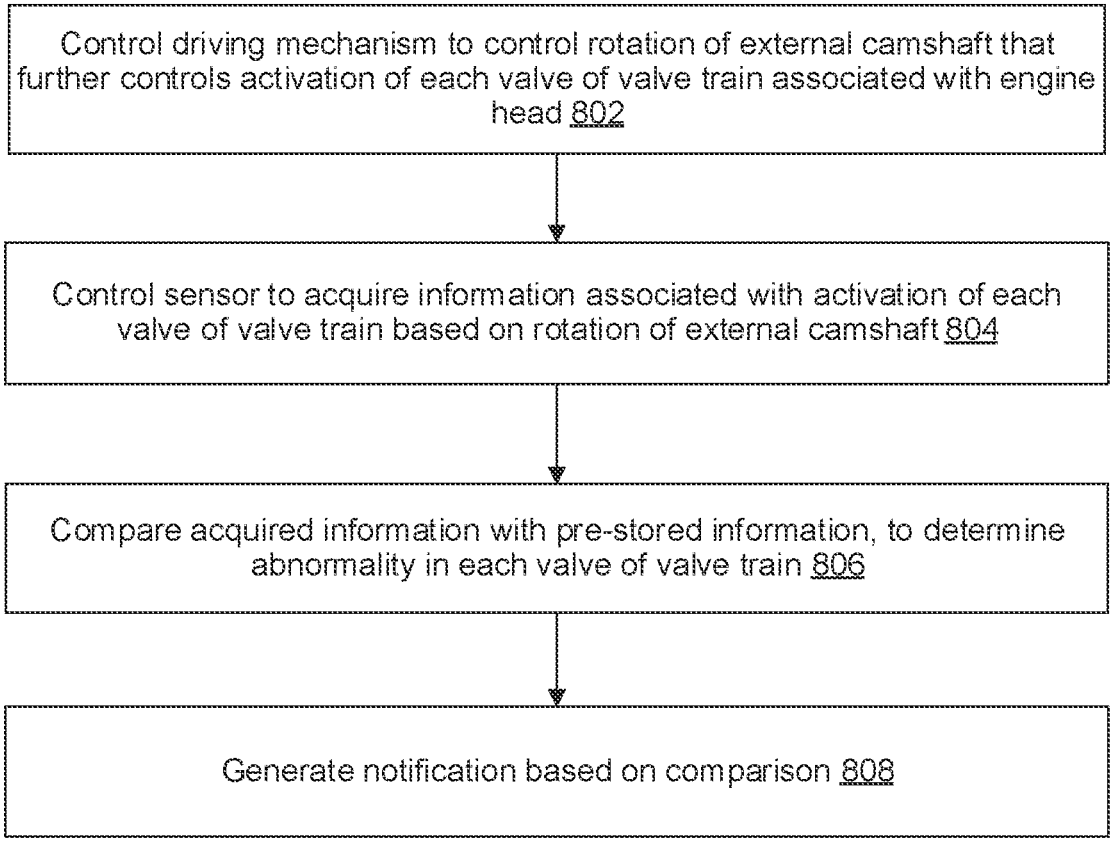
FIG. 8 is a flowchart that illustrates an exemplary method for testing valves via the apparatus of FIG. 1, in accordance with an embodiment of the disclosure.

FIG. 8 is a flowchart that illustrates an exemplary method for testing valves via the apparatus of FIG. 1, in accordance with an embodiment of the disclosure. FIG. 5 is explained in conjunction with elements from FIGS. 1, 2, 3, 4A-4C, 5A-5C, 6A-6C, and 7A-7C. With reference to FIG. 8, there is shown a flowchart 800 that depicts a method for testing each valve of the valve train 110. The method may be performed by at least one of: the apparatus 102, the circuitry 202, or the apparatus 302. The method illustrated in the flowchart 800 may start from 802.

At 802, the driving mechanism 106 may be controlled to control the rotation of the external camshaft 108 that may further control the activation of each valve of the valve train 110 that may be associated with the engine head 112. In an embodiment, the apparatus 102 may control the activation of each valve of the valve train 110, as described, for example, in FIGS. 1, and 4A-4C.

At 804, the sensor 104 may be controlled to acquire information associated with the activation of each valve of the valve train 110, based on the rotation of the external camshaft 108. In an embodiment, the apparatus 102 may be configured to control the sensor 104 to acquire the information (i.e. torque or force values) associated with the activation of each valve of the valve train 110, as described, for example, in FIGS. 1, 2, and 4A-4C.

At 806, the acquired information may be compared with the pre-stored information, to determine the abnormality in each valve of the valve train 110. In an embodiment, the apparatus 102 may compare the acquired information with the pre-stored information (i.e. predefined threshold limits), as described, for example, in FIGS. 1, 2, and 4A-4C.

At 808, the notification may be generated based on the comparison. In an embodiment, the apparatus 102 may generate the notification based on the comparison, as described, for example, in FIGS. 1, 2, and 4A-4C. Control may pass to end.

The flowchart 800 is illustrated as discrete operations, such as 802, 804, 806, and 808. However, in certain embodiments, such discrete operations may be further divided into additional operations, combined into fewer operations, or eliminated, or rearranged depending on the implementation without detracting from the essence of the disclosed embodiments.

Various embodiments of the disclosure may provide a non-transitory, computer-readable medium and/or storage medium, and/or a non-transitory machine readable medium and/or storage medium stored thereon, a set of instructions executable by a machine and/or a computer (for example the apparatus 102) to test each valve of the valve train 110 of the engine head 112. The set of instructions may be executable by the machine and/or the computer (for example, the apparatus 102 or the circuitry 202) to perform operations that may include, but are not limited to, control of the driving mechanism 106 to control a rotation of the external camshaft 108 that may further control the activation of each valve of the valve train 110 associated with the engine head 112, control of the sensor 104 to acquire information associated with the activation of each valve of the valve train 110 based on the rotation of the external camshaft 108, comparison of the acquired information with pre-stored information, to determine the abnormality in each valve of the valve train 110, and generation of the notification based on the comparison. The execution of operations is further described, for example, in FIGS. 4A-4C.

For the purposes of the present disclosure, expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Further, all joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible considering the above teachings. Some of those modifications have been discussed and others will be understood by those skilled in the art. The embodiments were chosen and described for illustration of various embodiments. The scope is, of course, not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a situation or material to the teachings of the present disclosure without departing from its scope. Therefore, it is intended that the present disclosure not be limited to the embodiment disclosed, but that the present disclosure will include all embodiments that fall within the scope of the appended claims.

What is claimed is:

1. An apparatus, comprising:
   a sensor;
   circuitry communicably coupled to the sensor and a driving mechanism associated with the sensor, wherein the driving mechanism is configured to control an external camshaft that is coupled to a valve train of an engine head, wherein the circuitry is configured to:
   control the driving mechanism to control a rotation of the external camshaft that further controls an activation of each valve of the valve train associated with the engine head;
   control the sensor to acquire information associated with the activation of each valve of the valve train based on the rotation of the external camshaft;
   compare the acquired information with pre-stored information, to determine an abnormality in each valve of the valve train; and
   generate a notification based on the comparison, wherein based on the comparison, the circuitry is further configured to determine the abnormality in at least one of: a valve bore, a valve stem, a valve seat, a valve spring, a valve guide, a valve seal, a valve guide seal, a cotter, a lubrication or a valve retainer associated with each valve of the valve train.

2. The apparatus according to claim 1, wherein the circuitry is further configured to transmit the generated notification to an operator device associated with the apparatus.

3. The apparatus according to claim 1, wherein the notification comprises at least one of: an audible notification, a visual notification, or a tactile notification.

4. The apparatus according to claim 1, wherein the circuitry is further configured to:
activate an actuator associated with the driving mechanism, wherein the actuator comprises at least one of: a stepper motor, a servomotor or an induction motor; and
control at least one of: a position of the external camshaft, a velocity of the external camshaft, or an acceleration of the external camshaft, based on the activation of the actuator associated with the driving mechanism.

5. The apparatus according to claim 1, wherein the sensor is disposed between the driving mechanism and the external camshaft,
wherein the acquired information comprises at least one of: a torque value or a force value associated with each valve of the valve train, and
wherein the acquired information is related to at least one of: a valve bore, a valve stem, a valve seat, a valve spring, a valve guide, a valve seal, a valve guide seal, a valve retainer, a cotter, or a lubrication associated with the valve train.

6. The apparatus according to claim 1, wherein the circuitry is further configured to compare a waveform associated with the pre-stored information with a waveform associated with the acquired information, and determine the abnormality based on the comparison.

7. The apparatus according to claim 1, wherein, based on the determination of the abnormality, the circuitry is further configured to generate assistance information, and wherein the assistance information relates to one or more instructions for further processing of the engine head.

8. The apparatus according to claim 1, wherein the pre-stored information is stored in a memory associated with the apparatus, or in a server that is communicably coupled to the apparatus.

9. The apparatus according to claim 1, wherein the circuitry is further configured to: control each member of plurality of engagement members that is disposed between each lobe of a plurality of lobes of the external camshaft and corresponding valve of the valve train of the engine head,
wherein, the control relates to a translation of each member of the plurality of engagement members based on the rotation of the external camshaft, and wherein the translation of each member of the plurality of engagement members further controls the activation of the corresponding valve of the valve train associated with the engine head.

10. The apparatus according to claim 1, wherein the external camshaft further comprises a plurality of planes and a plurality of lobes, wherein each plane of the plurality of planes is spaced from each other, and wherein each lobe of the plurality of lobes of the external camshaft is disposed at each plane of the plurality of planes.

11. The apparatus according to claim 10, wherein each lobe of the plurality of lobes is equally indented, from an axis of the external camshaft, at different angular configurations in each plane of the plurality of planes, and wherein the circuitry is further configured to control each lobe of the plurality of lobes to activate a corresponding valve of the valve train at different angular configurations of the external camshaft, based on the rotation of the external camshaft.

12. The apparatus according to claim 10, wherein each lobe of the plurality of lobes is disposed at a fixed angle, from an axis of the external camshaft, in each plane of the plurality of planes of the external camshaft, and wherein the circuitry is further configured to control each lobe of the plurality of lobes to activate a corresponding valve of the valve train at a fixed angular configuration of the external camshaft, based on the rotation of the external camshaft.

13. The apparatus according to claim 1, wherein the external camshaft further comprises a plurality of planes and a plurality of lobes, wherein each plane of the plurality of planes is spaced from each other, and wherein each lobe of the plurality of lobes of the external camshaft is disposed at each plane of the plurality of planes, and
wherein the circuitry is further configured to control each lobe of the plurality of lobes to activate each valve of the valve train for a plurality of occurrences, based on the rotation of the external camshaft.

14. The apparatus according to claim 13, wherein the circuitry is further configured to determine the plurality of occurrences of the activation of each valve of the valve train, based on a number of the plurality of lobes on each plane of the external camshaft.

15. A method, comprising:
in an apparatus having a sensor and a driving mechanism associated with the sensor, wherein the driving mechanism is configured to control an external camshaft that is coupled to a valve train of an engine head,
controlling the driving mechanism to control a rotation of the external camshaft that further controls an activation of each valve of the valve train associated with the engine head;
controlling the sensor to acquire information associated with the activation of each valve of the valve train based on the rotation of the external camshaft;
comparing the acquired information with pre-stored information, to determine an abnormality in each valve of the valve train; and
generating a notification based on the comparison.

16. The method according to claim 15, further comprising transmitting the generated notification to an operator device associated with the apparatus.

17. The method according to claim 15, wherein the sensor is disposed between the driving mechanism and the external camshaft,
wherein the acquired information comprises at least one of: a torque value or a force value associated with each valve of the valve train, and
wherein the acquired information is related to at least one of: a valve bore, a valve stem, a valve seat, a valve spring, a valve guide, a valve seal, a valve guide seal, a valve retainer, a cotter, or a lubrication associated with the valve train.

18. The method according to claim 15, based on the determination of the abnormality, further comprising generating assistance information, and wherein the assistance information relates to one or more instructions for further processing of the engine head.

19. The method according to claim 15, further comprising comparing a waveform associated with the pre-stored information with a waveform associated with the acquired information, and determining the abnormality based on the comparison.

20. An apparatus, comprising:
a sensor;
circuitry communicably coupled to the sensor and a driving mechanism associated with the sensor, wherein the driving mechanism is configured to control an external camshaft with a plurality of lobes that is coupled to a valve train, wherein the circuitry is configured to:
control the driving mechanism to control a rotation of the external camshaft that further controls an activation of each valve of the valve train;
control the sensor to acquire information associated with the activation of each valve of the valve train based on the rotation of the external camshaft;
compare the acquired information with pre-stored information, to determine an abnormality in each valve of the valve train; and
generate a notification based on the comparison, wherein when each lobe of the plurality of lobes is equally indented, from an axis of the external camshaft, at different angular configurations, the circuitry is further configured to control each lobe of the plurality of lobes to activate a corresponding valve of the valve train at different angular configurations of the external camshaft, based on the rotation of the external camshaft,
wherein when each lobe of the plurality of lobes is disposed at a fixed angle, from an axis of the external camshaft, the circuitry is further configured to control each lobe of the plurality of lobes to activate a corresponding valve of the valve train at a fixed angular configuration of the external camshaft, based on the rotation of the external camshaft, and
wherein when each lobe of the plurality of lobes has a multilobe structure, the circuitry is further configured to control each lobe of the plurality of lobes to activate each valve of the valve train for a plurality of occurrences, based on the rotation of the external camshaft.

* * * * *